US011206961B2

(12) United States Patent
Sato et al.

(10) Patent No.: US 11,206,961 B2
(45) Date of Patent: Dec. 28, 2021

(54) SOUND ABSORPTION STRUCTURE FOR AIR FLOW PATH IN ELECTRIC AIR FLOW GENERATION DEVICE AND ELECTRIC VACUUM

(71) Applicant: KYOCERA INDUSTRIAL TOOLS CORPORATION, Fuchu (JP)

(72) Inventors: Yoshinari Sato, Fukuyama (JP); Yuta Takahashi, Onomichi (JP)

(73) Assignee: KYOCERA INDUSTRIAL TOOLS CORPORATION, Hiroshima (JP)

( * ) Notice: Subject to any disclaimer, the term of this patent is extended or adjusted under 35 U.S.C. 154(b) by 284 days.

(21) Appl. No.: 16/491,572

(22) PCT Filed: Mar. 6, 2018

(86) PCT No.: PCT/JP2018/008639
§ 371 (c)(1),
(2) Date: Sep. 6, 2019

(87) PCT Pub. No.: WO2018/164145
PCT Pub. Date: Sep. 13, 2018

(65) Prior Publication Data
US 2020/0383534 A1      Dec. 10, 2020

(30) Foreign Application Priority Data

Mar. 8, 2017  (JP) .............................. JP2017-043392
Jun. 7, 2017  (JP) .............................. JP2017-112474

(51) Int. Cl.
*A47L 9/00*       (2006.01)
*B08B 5/02*       (2006.01)
(Continued)

(52) U.S. Cl.
CPC ............... *A47L 9/0081* (2013.01); *A47L 5/14* (2013.01); *A47L 5/28* (2013.01); *A47L 9/149* (2013.01);
(Continued)

(58) Field of Classification Search
CPC ... A01G 20/47; A47L 5/14; A47L 5/28; A47L 9/0081; A47L 9/149; B08B 5/02; B08B 5/04; G10K 11/161; G10K 11/162
See application file for complete search history.

(56) References Cited

U.S. PATENT DOCUMENTS 4,421,202 A  *  12/1983  Hoy ...................... F16L 55/027
                                                   138/130
5,042,108 A  *  8/1991   Yamazumi .......... F16L 55/0336
                                                    15/326

(Continued)

FOREIGN PATENT DOCUMENTS

EP           0399433 A1    11/1990
JP         H2-307418 A     12/1990
(Continued)

*Primary Examiner* — Marc Carlson
(74) *Attorney, Agent, or Firm* — Hauptman Ham, LLP

(57) ABSTRACT

Provided is a structure including a sound absorption section provided in an air flow path on an exhaust side of a fan, traversing a joint portion between a first main housing and a second main housing. The sound absorption section has a double wall structure including an inner wall facing the air flow path and an outer wall spaced outward from the inner wall. A sound absorption member is interposed in a sound absorption chamber between the inner wall and the outer wall of the sound absorption section. A communication hole communicating with the air flow path and the sound absorption chamber is formed in the inner wall of the sound absorption section at a position away from the joint portion.

5 Claims, 22 Drawing Sheets

(51) Int. Cl.
  *B08B 5/04* (2006.01)
  *A47L 9/14* (2006.01)
  *A47L 5/14* (2006.01)
  *A47L 5/28* (2006.01)
  *G10K 11/16* (2006.01)
  *A01G 20/47* (2018.01)

(52) U.S. Cl.
  CPC ............... *B08B 5/02* (2013.01); *B08B 5/04* (2013.01); *G10K 11/161* (2013.01); *A01G 20/47* (2018.02)

(56) References Cited

U.S. PATENT DOCUMENTS

| | | | |
|---|---|---|---|
| 5,517,716 A * | 5/1996 | Park | A47L 9/0081 15/326 |
| 5,597,986 A * | 1/1997 | Harwood | F01N 1/02 181/272 |
| 5,718,045 A * | 2/1998 | Tsukahara | F01N 1/084 181/228 |
| 5,821,473 A * | 10/1998 | Takahashi | F04D 29/664 181/224 |
| 5,841,080 A * | 11/1998 | Iida | F01N 1/24 181/225 |
| 6,158,082 A * | 12/2000 | Beckey | A47L 9/0081 15/326 |
| 6,324,720 B1 * | 12/2001 | Beckey | A47L 9/0081 15/326 |
| 8,789,237 B2 * | 7/2014 | Hatano | E01H 1/0809 15/405 |

FOREIGN PATENT DOCUMENTS

| | | | |
|---|---|---|---|
| JP | 2006-346199 A | 12/2006 | |
| JP | 2012011058 A * | 1/2012 | |
| JP | 4879238 B2 | 2/2012 | |
| WO | WO-2016132777 A1 * | 8/2016 | ............ F01N 1/084 |

* cited by examiner

SOUND ABSORPTION STRUCTURE FOR AIR FLOW PATH IN ELECTRIC AIR FLOW GENERATION DEVICE AND ELECTRIC VACUUM

RELATED APPLICATIONS

The present application is a National Phase of International Application No. PCT/JP2018/008639, filed Mar. 6, 2018, and claims priority based on Japanese Patent Application No. 2017-043392, filed Mar. 8, 2017 and Japanese Patent Application No. 2017-112474, filed Jun. 7, 2017.

TECHNICAL FIELD

The present invention relates to a sound absorption structure for an air flow path in an electric air flow generation device such as electric blower for collecting fallen leaves at one place or an electric vacuum for drawing fallen leaves, and an electric vacuum.

BACKGROUND ART

For example, an electric vacuum such as that disclosed in Patent Document 1 causes noise problems because an air flow is generated by the rotation of a fan to draw fallen leaves and the like in. For the noise problems, while Patent Document 1 devises measures such as providing a sound absorption member, noise emitted to the outside from an air flow path are required to be further reduced. Thus, providing the sound absorption member in the air flow path has been studied.

In contrast, Patent Document 2 discloses a configuration in which a sound absorption member is provided outside a suction pipe. Unfortunately, the sound absorption member provided outside the pipe is covered with a lid which is a separate part from the pipe in the configuration, so that there is a problem of poor assemblability. In addition, Patent Document 3 proposes a configuration in which a separate outer tube is fixed to an outer side of an inner tube using a screw or the like to form an annular sound absorption chamber between the inner tube and the outer tube, and a sound absorption member is disposed in the sound absorption chamber. Unfortunately, this configuration requires the separate outer tube to be attached to the inner tube, so that there is the same problem of poor assemblability.

CITATION LIST

Patent Document

Patent Document 1: JP 2006-346199 A
Patent Document 2: JP H02-307418 A
Patent Document 3: JP 4879238 B

SUMMARY OF INVENTION

Technical Problem

Thus, the present invention is made in light of the above conventional problems, and an object thereof is to provide a sound absorption structure for an air flow path in an electric air flow generation device and an electric vacuum in which noise emitted from the air flow path can be reduced and excellent assemblability can be provided.

Solution to Problem

The present invention is made to solve the problems described above, and a sound absorption structure for an air flow path in an electric air flow generation device according to an aspect of the present invention includes: an air flow path through which an air flow for blowing or drawing passes, the air flow path having a structure split in two and being formed with a first housing and a second housing being jointed to each other; and a sound absorption section provided at a predetermined position on the air flow path, traversing a joint portion between the first housing and the second housing. The sound absorption section has a double wall structure including an inner wall facing the air flow path and an outer wall spaced outward from the inner wall. A sound absorption member is interposed in a sound absorption chamber between the inner wall and the outer wall of the sound absorption section. A communication hole communicating with the air flow path and the sound absorption chamber is formed in the inner wall of the sound absorption section at a position away from the joint portion.

The sound absorption section is provided along the air flow path in the structure above, so that sounds are absorbed in the air flow path. Thus, noise to be emitted to the outside from the air flow path can be reduced. The first housing and the second housing, having a structure split in two, are jointed to each other to form the air flow path, and the sound absorption section is formed traversing the joint portion between the first housing and the second housing. Thus, the sound absorption chamber is formed as a single finished sound absorption chamber by jointing the first housing to the second housing. As a result, a member such as a lid which is a separate part from the first housing and the second housing is unnecessary, and the sound absorption section can be formed by jointing the first housing to the second housing. This facilitates assembly. In addition, the communication hole is formed at a position away from the joint portion, so that an opening area required to obtain sufficient sound absorption effects can be easily ensured by setting the number and size of the communication holes to appropriate values.

In a case that a plurality of the communication holes are provided, some of the communication holes may be provided traversing the joint portion. However, in a case that all of the communication holes are formed at respective positions away from the joint portion such that the joint portion has no communication hole, the sound absorption member such as a sponge can be smoothly inserted into the sound absorption chamber from an opening of the first housing or an opening of the second housing. In a case that the communication hole is formed traversing the joint portion, the communication hole is divided into that in the first housing and that in the second housing, and thus a cut portion is formed in each of an opening edge of the first housing and an opening edge of the second housing to serve as the communication hole. Thus, in a case that the sound absorption structure has a configuration in which the sound absorption member is inserted into the sound absorption chamber from the opening of the first housing and the opening of the second housing, the sound absorption member is likely to catch on the cut portion in the opening edge of the first housing and the cut portion in the opening edge of the second housing. Meanwhile, in a case that the sound absorption structure has a configuration in which all of the communication holes are formed at respective positions away from the joint portion, the cut portion is not formed in the opening edge of the first housing and the opening edge of the second housing, and the sound absorption member can be smoothly inserted into the sound absorption chamber.

In particular, it is preferable that a plurality of the sound absorption chambers divided into an upstream side and a downstream side of the air flow path by a partition wall are provided, the partition wall includes a screw boss configured to integrally couple the first housing to the second housing with a screw, and a large number of the communication holes are formed substantially throughout the inner wall of the sound absorption section, except a portion corresponding to the partition wall. In a case that the plurality of sound absorption chambers are provided in a flow direction of the air flow path as described above, the sound absorption chambers can be provided in a long section of the air flow path to enable a high sound absorption effect to be obtained. The partition wall is also provided between the sound absorption chambers, so that the first housing and the second housing can be effectively reinforced by the partition wall. In a case that the partition wall is provided with the screw boss, the partition wall can be efficiently used and a reinforcing effect is also increased. In addition, a large number of the communication holes are formed substantially throughout the inner wall of the sound absorption section, except the portion corresponding to the partition wall, so that an overall opening area acquired by summing an opening area of each of the plurality of communication holes can be sufficiently ensured, without excessively increasing a size of each of the communication holes, to enable a high sound absorption effect to be obtained. Even in a case that a large number of communication holes are formed in the inner wall as described above, the inner wall and the outer wall are integrally coupled by the partition wall to enable the decrease in strength of the inner wall to be minimized.

Additionally, it is preferable that the inner wall of the sound absorption member includes a wall component composed of a separate member from the first housing and the second housing, and a communication hole is formed in the wall component. In a case that the sound absorption structure has a configuration in which the wall component composed of a separate member from the first housing and the second housing includes the communication hole, the communication hole can be easily provided in the inner wall of the sound absorption section and manufacturing of the first housing and the second housing is also facilitated. The wall component can be made of a material different from that of the first housing and the second housing. For example, in a case that the communication hole is formed, the inner wall of the sound absorption section is likely to decrease in strength. However, in a case that the wall component is made of a material having greater strength than that of the first housing and the second housing, the inner wall of the sound absorption section can be easily increased in strength. While the inner wall of the sound absorption section is likely to be worn and damaged in a case that dust passing through the air flow path colliding with the inner wall, the wall component made of a material having excellent wear resistance and impact resistance can prevent the inner wall of the sound absorption member from wearing and damaging, and the sound absorption structure can be durable for long-term use.

An electric vacuum according to an aspect of the present invention includes: an air flow path having a structure split in two and formed with a first housing and a second housing jointed to each other; a fan disposed midway of the air flow path and configured to generate an air flow. A sound absorption section is provided along the air flow path on an exhaust side of the fan, traversing a joint portion between the first housing and the second housing. The sound absorption section has a double wall structure including: an inner wall facing the air flow path and an outer wall spaced outward from the inner wall. A sound absorption member is interposed in a sound absorption chamber between the inner wall and the outer wall of the sound absorption section. A communication hole communicating with the air flow path and the sound absorption chamber is formed in the inner wall of the sound absorption section at a position away from the joint portion.

Note that it is found that noise particularly increases more in the air flow path on an exhaust side than in that on an intake side of the fan. This phenomenon particularly occurs in a case that the fan is configured to crush objects to be drawn, such as fallen leaves drawn, and send them to the exhaust side. It is conceivable that the phenomenon above is caused by various factors such as: the fan rotates to generate a turbulent flow and the turbulent flow of air passes through the air flow path on the exhaust side of the fan; crushed objects such as fallen leaves pass through the air flow path on the exhaust side of the fan together with air; the air flow path on the exhaust side is located closer to a worker than the air flow path on the intake side; and effect of crushing sound of fallen leaves and the like. In any factor, in a case that the sound absorption section is provided on the exhaust side of the fan, noise can be effectively reduced.

It is also preferable that a dust collection case that is detachable is provided and a sound absorption section is provided near an exhaust port of the air flow path configured to allow air to be exhausted to the dust collection case, and at least a portion of the sound absorption section is located inside the dust collection case in a case that the dust collection case is attached. In the case that the sound absorption section is provided near the exhaust port as described above, noise on the exhaust side of the fan can be efficiently reduced. In addition, in the case that at least a part of the sound absorption section is located inside the dust collection case, at least the part of the sound absorption section is covered with the dust collection case. Thus, noise is less likely to be emitted to the outside, so that the noise can be further effectively reduced.

Advantageous Effects of Invention

As described above, in a case that the sound absorption section is provided along the air flow path, noise emitted from the air flow path can be effectively reduced. In addition, the sound absorption section is configured to traverse the joint portion between the first housing and the second housing, so that the sound absorption section can be formed by jointing the first housing to the second housing, which provides the sound absorption structure and the electric vacuum with excellent assemblability.

DESCRIPTION OF EMBODIMENT

Figure 1:
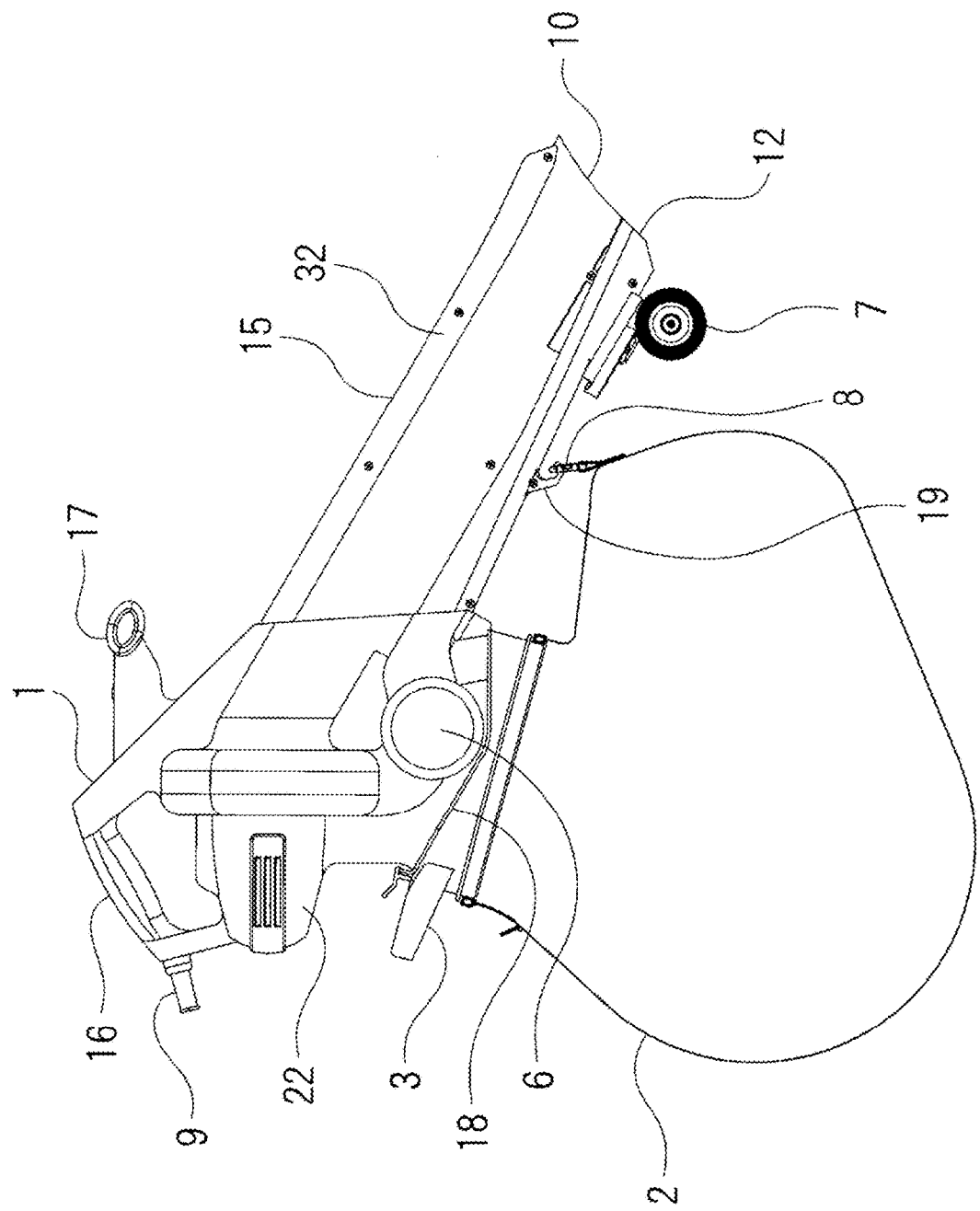
FIG. 1 is a front view illustrating an electric vacuum according to an embodiment of the present invention.
Figure 2:
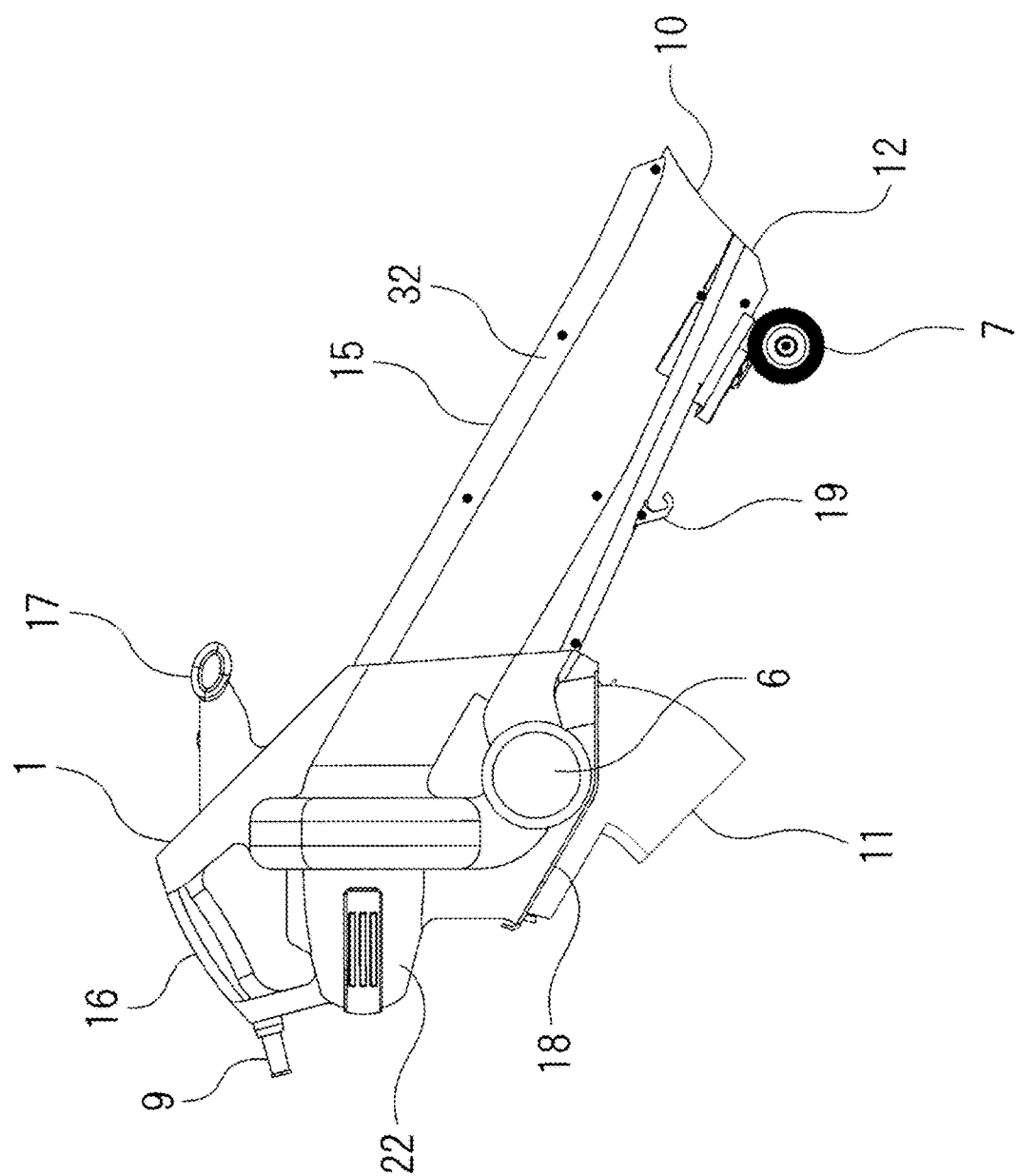
FIG. 2 is a front view illustrating the electric vacuum from which a dust bag is removed.
Figure 3:
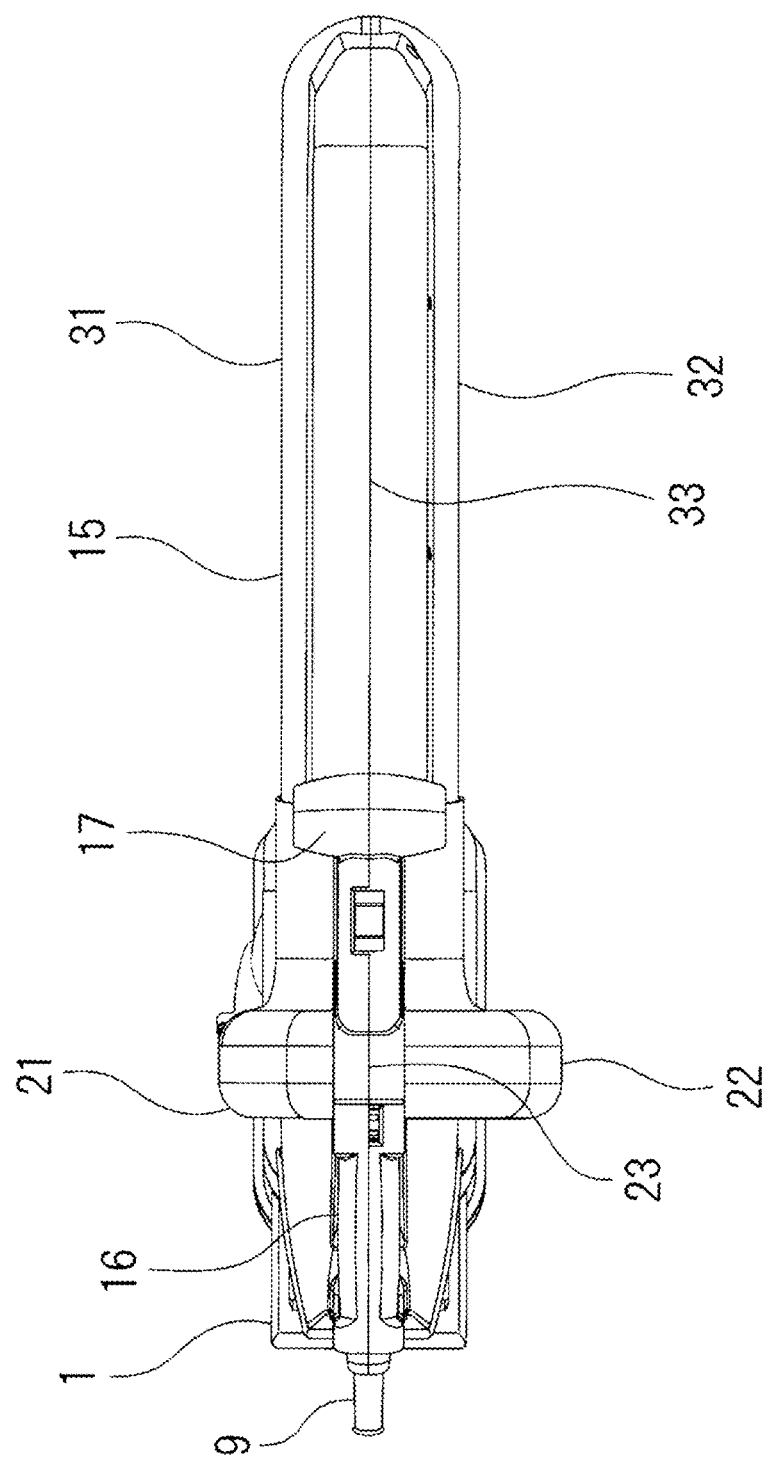
FIG. 3 is a plan view of the electric vacuum.
Figure 4:
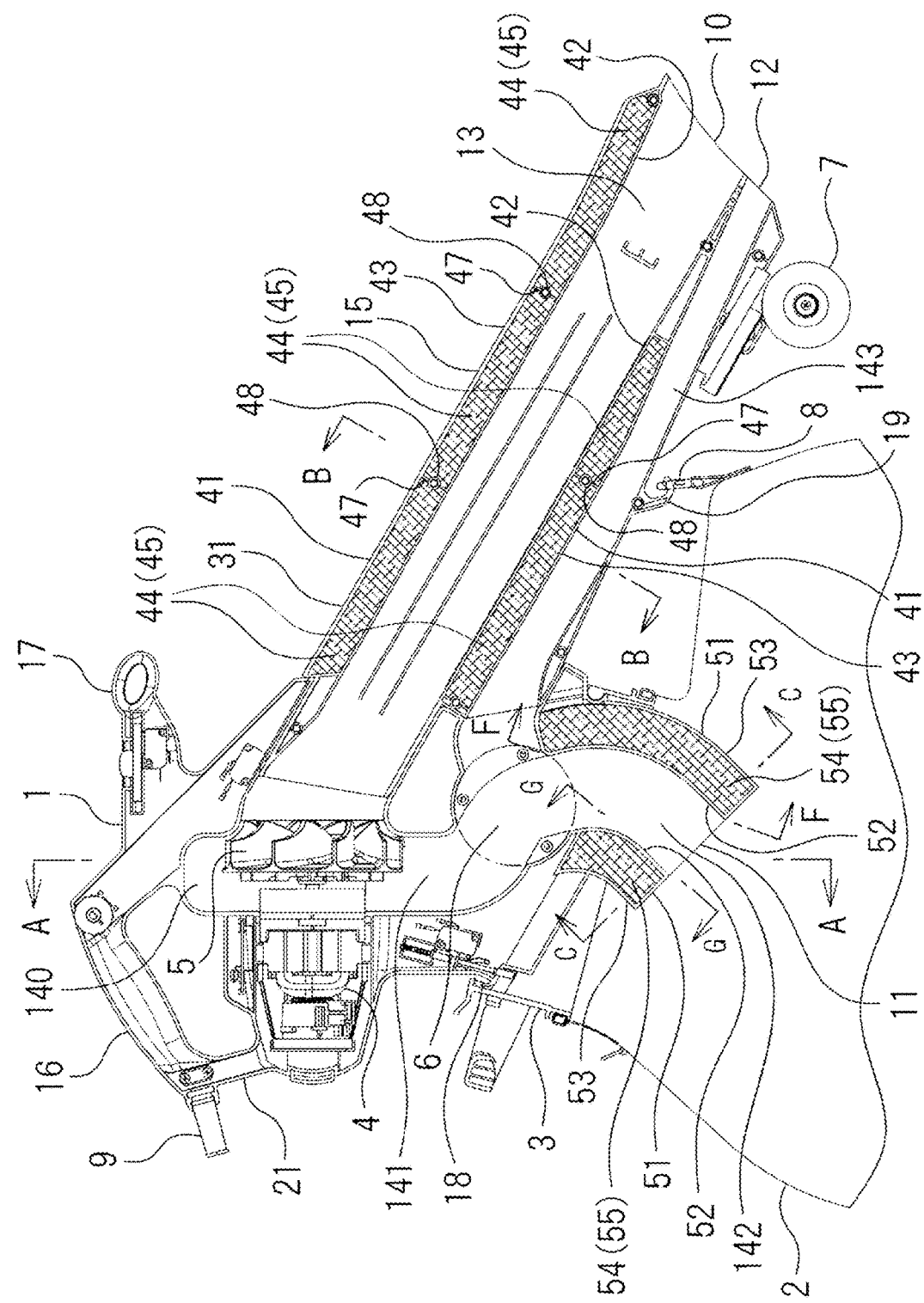
FIG. 4 is a cross-sectional view of the electric vacuum as viewed from the front.

Hereinafter, an electric vacuum as an electric air flow generation device according to an embodiment of the present invention will be described with reference to FIGS. 1 to 18. The electric vacuum according to the present embodiment has not only a vacuum function (drawing function) for drawing and crushing fallen leaves and the like and collecting them in a dust bag 2 as a dust collection case, but also has a blower function (collecting function) for collecting fallen leaves and the like at one place, and is also referred to as an electric blower vacuum. The electric vacuum generates an air flow for drawing fallen leaves and the like and an air flow for blowing toward fallen leaves and the like. The electric vacuum includes air flow paths 13, and 140 to 143 through which the air flow passes. As illustrated in FIGS. 1, 2, and 4, the electric vacuum includes an intake port 10, an exhaust port 11 for dust collection, and an exhaust port 12 for blowing, and the air flow paths 13, and 140 to 143 connect the intake port 10 and the two exhaust ports 11 and 12. A fan 5 driven by a motor 4 is disposed midway in the air flow paths 13, and 140 to 143, and the fan 5 rotates to generate an air flow. Note that FIGS. 1 and 4 each illustrate a state in which the motor 4 and the fan 5 each have a rotational center axis extending horizontally in a front-rear direction, and this state is described below as a reference state. While a power cord 9 is provided in the present embodiment, a battery pack may be provided to form a cordless structure.

The fan 5 is disposed midway in the air flow paths 13, and 140 to 143, so that the air flow paths 13, and 140 to 143 are divided into a section upstream of the fan 5 and a section downstream of the fan 5. The section upstream of the fan 5 in a total length of the air flow paths 13, and 140 to 143 is referred to as an air flow path 13 on an intake side, and the section downstream of the fan 5 in the total length of the air flow paths 13, and 140 to 143 is referred to as air flow paths 140 to 143 on an exhaust side. A section from the intake port 10 to the fan 5 is the air flow path 13 on the intake side. The air flow paths 140 to 143 on the exhaust side branch to two paths midway in the air flow paths. One of the two paths extends toward the exhaust port 11 for dust collection, and the other extends toward the exhaust port 12 for blowing. A switching drum 6 serving as a switching valve is provided at a branch point of the air flow paths 140 to 143 on the exhaust side. The switching drum 6 is configured to rotate about an axis in a right-left direction, and can be switched between the vacuum function and the blower function by rotating the switching drum 6 of a dial type.

The switching drum 6 is disposed at a position separated by a predetermined distance below the fan 5. The air flow paths 140 to 143 on the exhaust side are a single path between the fan 5 and the switching drum 6, and branch into two paths on the downstream side of the switching drum 6. One of the two paths, into which the air flow paths 140 to 143 on the exhaust side branch at the switching drum 6, extends to the exhaust port 11 for dust collection, and the other extends to the exhaust port 12 for blowing. Thus, the air flow paths 140 to 143 on the exhaust side include common sections 140 and 141 from the fan 5 to the switching drum 6, a dust collection section 142 from the switching drum 6 to the exhaust port 11 for dust collection, and a blowing section 143 from the switching drum 6 to the exhaust port 12 for blowing.

FIG. 4 illustrates the switching drum 6 set to a dust collection side, in which the common sections 140 and 141 connect with the dust collection section 142, and the air flow path between the common sections 140 and 141 and the blowing section 143 is blocked. The dust collection section 142 extends schematically downward from the switching drum 6, specifically extends obliquely backward and downward, and more specifically extends backward and downward in a curved manner. The exhaust port 11 for dust collection opens obliquely backward. The blowing section 143 extends forward and obliquely downward from the switching drum 6. The dust collection section 142 may be configured to extend downward substantially linearly from the switching drum 6, and the exhaust port 11 for dust collection may be configured to open downward.

The electric vacuum includes a main body 1 and a dust bag 2 detachably attached to the main body 1. As illustrated in FIGS. 1 to 4, the main body 1 includes a nozzle portion 15 extending obliquely downward from its rear side toward its front side, and a wheel 7 is disposed below a front portion of the nozzle portion 15. The air flow path 13 on the intake side is formed linearly along the nozzle portion 15 in an upper portion inside the nozzle portion 15, and the intake port 10 opens in an upper portion of a front-end portion of the nozzle portion 15. The blowing section 143 extends below the air flow path 13 on the intake side, in parallel with the air flow path 13 on the intake side, and the exhaust port 12 for blowing opens in a lower portion of the front-end portion of the nozzle portion 15. Thus, the intake port 10 and the exhaust port 12 for blowing are disposed side by side vertically. The main body 1 is provided in its upper portion with a main handle portion 16 located on a rear side, and a sub-handle portion 17 located on a front side. The motor 4 is disposed below the main handle portion 16. The motor 4 rotates about an axis extending in the front-rear direction.

The fan 5 is attached to a position in front of the motor 4. The nozzle portion 15 is inclined obliquely downward with respect to a rotational center axis of the motor 4 and the fan 5, and the air flow path 13 on the intake side extends forward and downward from a front surface of the fan 5. The fan 5 rotates counterclockwise when viewed from the front side thereof as in FIG. 5, and in a case that the fan 5 rotates, air is drawn from the intake port 10 and flows toward the fan 5. The fan 5 is configured to discharge air flowing from the front side, radially outward, and to enable fallen leaves and the like to be crushed.

Figure 5:
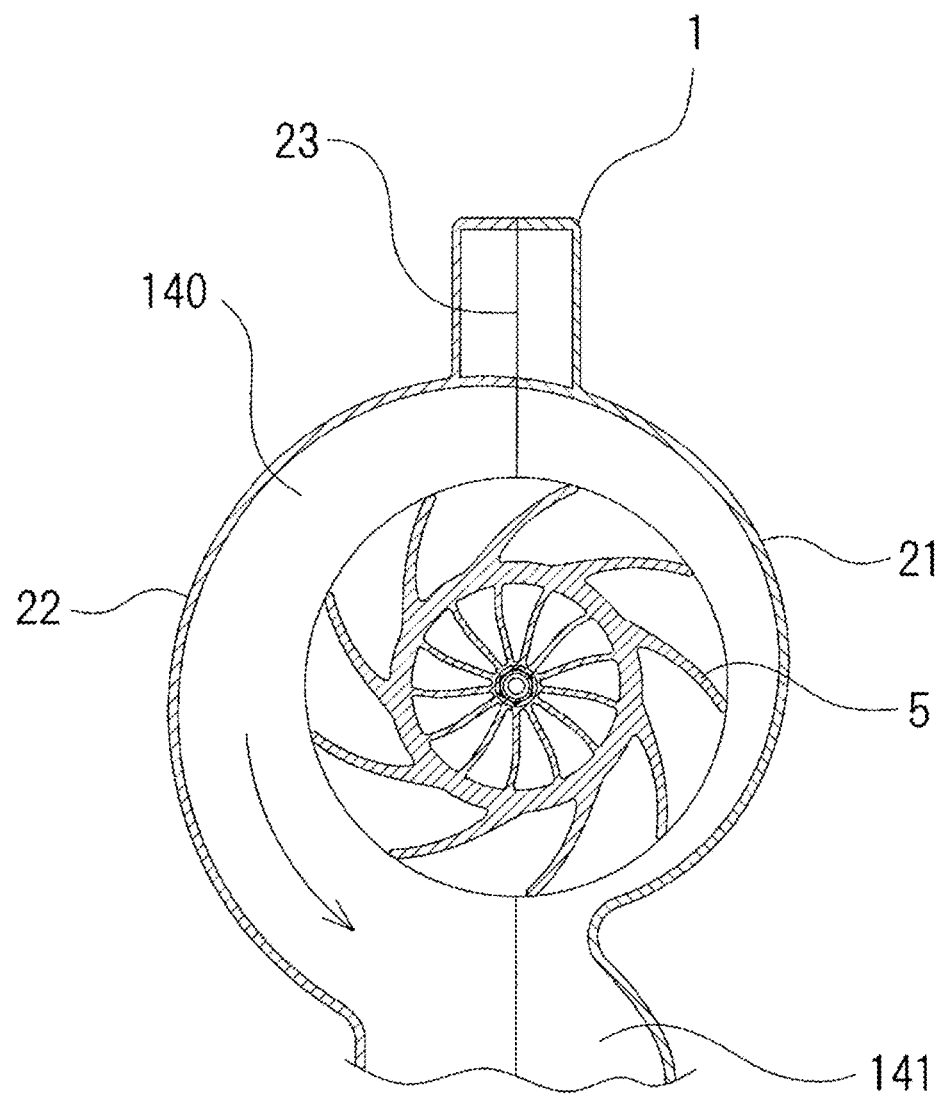
FIG. 5 is a cross-sectional view taken along line A-A of FIG. 4.

As illustrated in FIG. 5, an air flow path is formed circling substantially once around the fan 5. The air flow path circling around the fan 5 is referred to as a circling section 140. The circling section 140 is formed so as to gradually increase in diameter along a rotational direction of the fan 5, and thus the circling section 140 gradually increases in cross-sectional area along the rotational direction of the fan 5 to be greatest at a position below the fan 5. The circling section 140 constitutes an upstream portion of the common sections 140 and 141 of the air flow paths 140 to 143 on the exhaust side. The common sections 140 and 141 of the air flow paths 140 to 143 on the exhaust side extend substantially vertically downward in a position below the fan 5, and then extend curving slightly forward to reach the switching drum 6. A section from the position below the fan 5 to the switching drum 6 is referred to as an extension section 141. The extension section 141 constitutes a downstream portion of the common sections 140 and 141 of the air flow paths 140 to 143 on the exhaust side. As described above, the common sections 140 and 141 of the air flow paths 140 to 143 on the exhaust side includes the circling section 140 circling around the fan 5 and the extension section 141 from the position below the fan 5 to the switching drum 6.

FIGS. 1 and 4 each illustrate a state in which the dust bag 2 is attached, and FIG. 2 illustrates a state in which the dust bag 2 is removed. The dust bag 2 is made of a fabric having flexibility and breathability as a main material, and is provided on its rear surface side with a disposal opening (not illustrated) that can be opened and closed with a fastener. The dust bag 2 is attached to the main body 1 with a bag holder 3. Thus, the dust collection case is composed of the dust bag 2 and the bag holder 3 in the present embodiment. FIG. 2 illustrates the state in which a set of the bag holder 3 and the dust bag 2 is removed from the main body 1. The bag holder 3 is generally in a tubular shape, and an opening of the dust bag 2 is mounted on an outer peripheral surface of a lower end portion of the bag holder 3. The main body 1 is provided in its lower portion with a bag attachment portion 18, and the bag holder 3 is attached to the bag attachment portion 18. The dust collection section 142 includes a lower portion projecting downward from the bag attachment section 18. In a case that the bag holder 3 attached with the dust bag 2 is attached to the bag attachment portion 18 of the main body 1, the lower portion of the dust collection section 142 projecting downward from the bag attachment portion 18 is covered with the bag holder 3 and the dust bag 2 from outside. Note that the dust bag 2 includes a ring 8 that can be hooked by a hook 19 provided on a lower surface of the nozzle portion 15 of the main body 1. In a case that the switching drum 6 is rotated to one side, air flows into the dust collection section 142 as in FIG. 4, and is discharged from the exhaust port 11 for dust collection to the dust bag 2 so that dust is collected in the dust bag 2. In a case that the switching drum 6 is rotated to the other side, air flows into the blowing section 143, and is discharged forward and downward from the exhaust port 12 for blowing.

Structure of Housing

The electric vacuum includes a housing for forming a housing space for not only housing the fan 5, the motor 4, and the like, but also forming an air flow path. The housing includes two portions that are a main housing 21, 22 and a nozzle housing 31, 32. The main housing 21, 22 and the nozzle housing 31, 32 are separated from each other, and are configured as separate components. The nozzle housing 31, 32 constitutes the nozzle portion 15, and is inserted into an opening opened on a front side of the main housing 21, 22 to be integrated with the main housing 21, 22. The main housing 21, 22 constitutes another portion except the nozzle portion 15, and includes a portion housing the fan 5 and the motor 4, the main handle portion 16, the sub-handle portion 17, mainly the common sections 140 and 141 and the dust collection section 142 of the air flow paths 140 to 143 on the exhaust side, and the bag attachment portion 18.

The main housing 21, 22 and the nozzle housing 31, 32 each have a structure split in two, and specifically a structure split in two right and left parts. The main housing 21, 22 is formed by jointing a first main housing 21 and a second main housing 22, the first main housing 21 and the second main housing 22 having a structure split in two right and left parts, to each other. The nozzle housing 31, 32 is formed by jointing a first nozzle housing 31 and a second nozzle housing 32, the first nozzle housing 31 and the second nozzle housing 32 having a structure split in two right and left parts, to each other. The main housing 21, 22 is provided with a joint portion 23 between the first main housing 21 and the second main housing 22. Likewise, the nozzle housing 31, 32 is provided with a joint portion 33 between the first nozzle housing 31 and the second nozzle housing 32. FIG. 4 is a cross-sectional view taken along the joint portions 23 and 33. Thus, FIG. 4 illustrates only the first main housing 21 and the first nozzle housing 31 positioned left as viewed from a rear side of each of the main housing 21, 22 and the nozzle housing 31, 32, and does not illustrate the second main housing 22 and the second nozzle housing 32 positioned right as viewed from the rear side. The joint portion 23 is a plane orthogonal to a joint direction (the right-left direction).

Sound Absorption Section 41 on Intake Side

Figure 6:
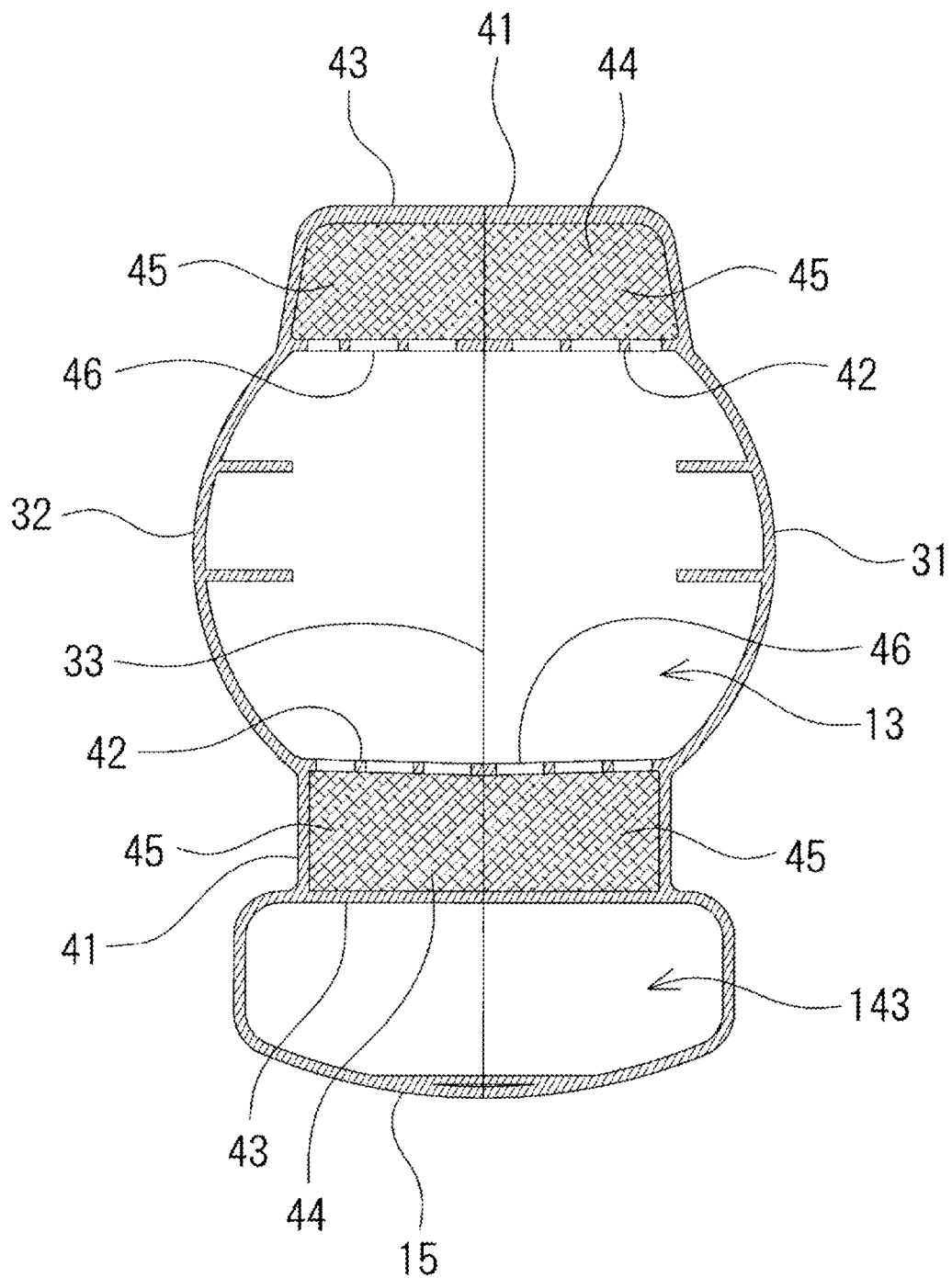
FIG. 6 is a cross-sectional view taken along line B-B of FIG. 4.

As illustrated in FIG. 4, a sound absorption section 41 configured to absorb sound in the air flow path 13 is provided outside the air flow path 13 on the intake side. The sound absorption section 41 is provided in each of the portions above and below the air flow path 13 on the intake side, and is provided along a length covering most of a total length of the air flow path 13 on the intake side. The sound absorption section 41 provided at the portion below the air flow path 13 on the intake side is located between the air flow path 13 and the blowing section 143, and is formed in a boundary portion that partitions the air flow path 13 on the intake side and the blowing section 143. The sound absorption section 41 has a double wall structure including an inner wall 42 defining and forming the air flow path 13 while facing the air flow path 13, and an outer wall 43 provided outside and away from the inner wall 42, and then a sound absorption chamber 44 is formed between the inner wall 42 and the outer wall 43. The sound absorption chamber 44 has an elongated shape along the air flow path 13 on the intake side. As illustrated in FIG. 6, the sound absorption chamber 44 has a cross-sectional shape in which a dimension in the joint direction, i.e., a dimension in the right-left direction, is longer than a separation distance between the inner wall 42 and the outer wall 43, i.e., a dimension in a vertical direction. The inner wall 42 and the outer wall 43 are substantially orthogonal to the joint portion 33. The sound absorption chamber 44 is filled with a sound absorption member 45 made of a sponge, and the inner wall 42 of the sound absorption section 41 is provided with a plurality of communication holes 46 that communicates with the air flow path 13 and the sound absorption chamber 44. The sponge serving as the sound absorption member 45 is preferably cut to a predetermined size and used, and can be curved along a shape of the sound absorption chamber 44.

Figure 7:
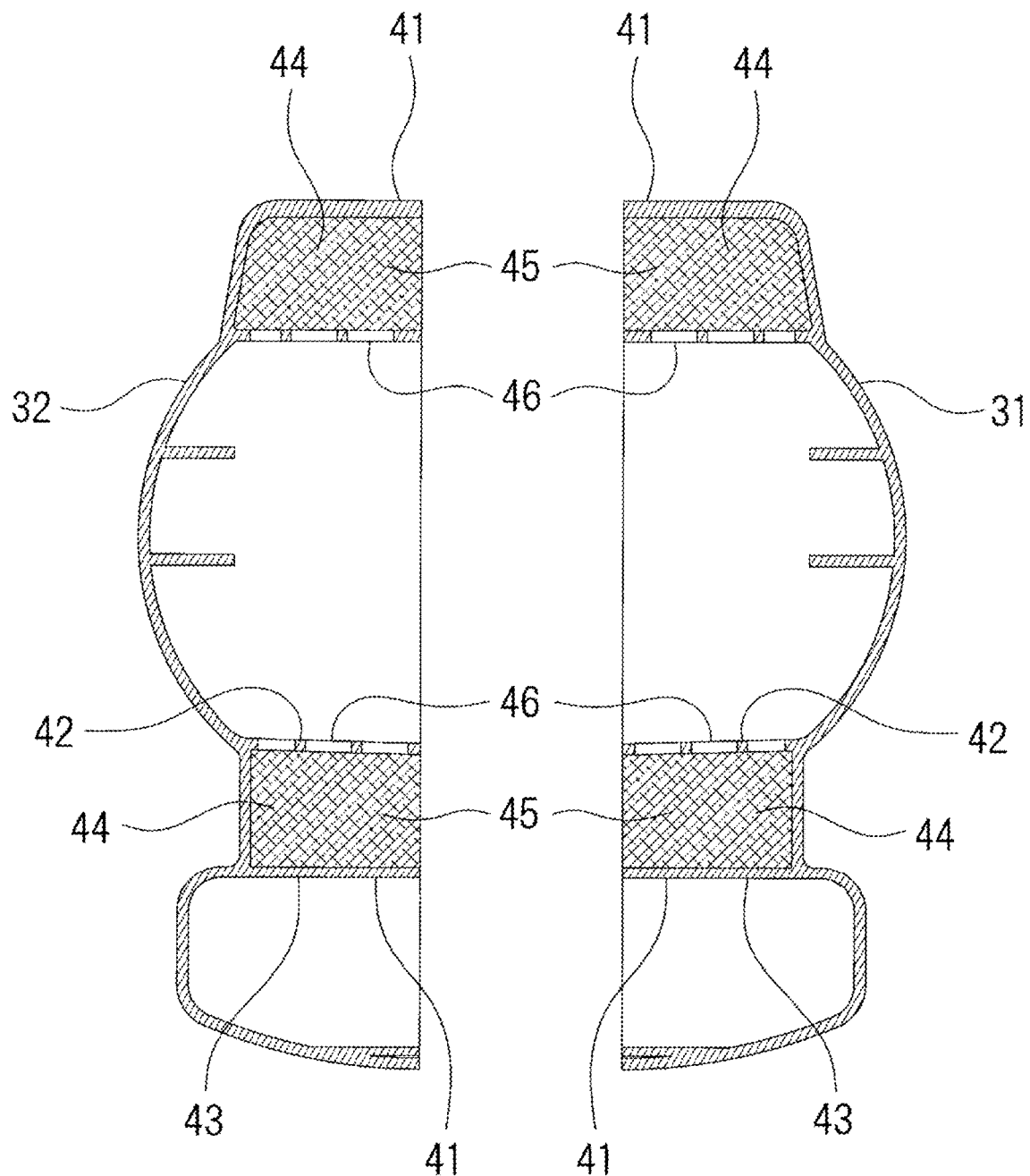
FIG. 7 is a cross-sectional view corresponding to FIG. 6, illustrating a nozzle housing that is separated.
Figure 8:
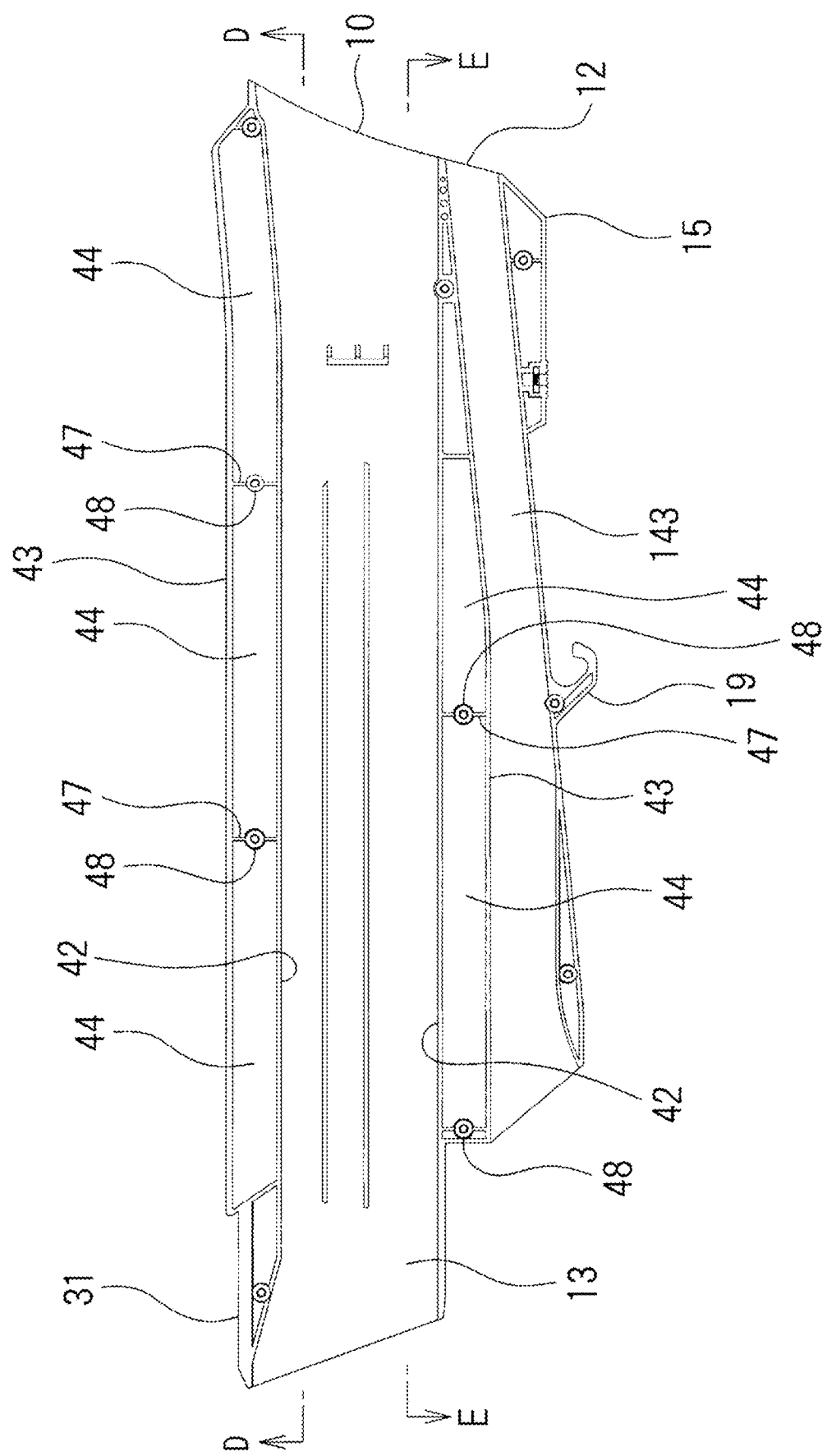
FIG. 8 is a front view illustrating one nozzle housing of the electric vacuum.
Figure 9:
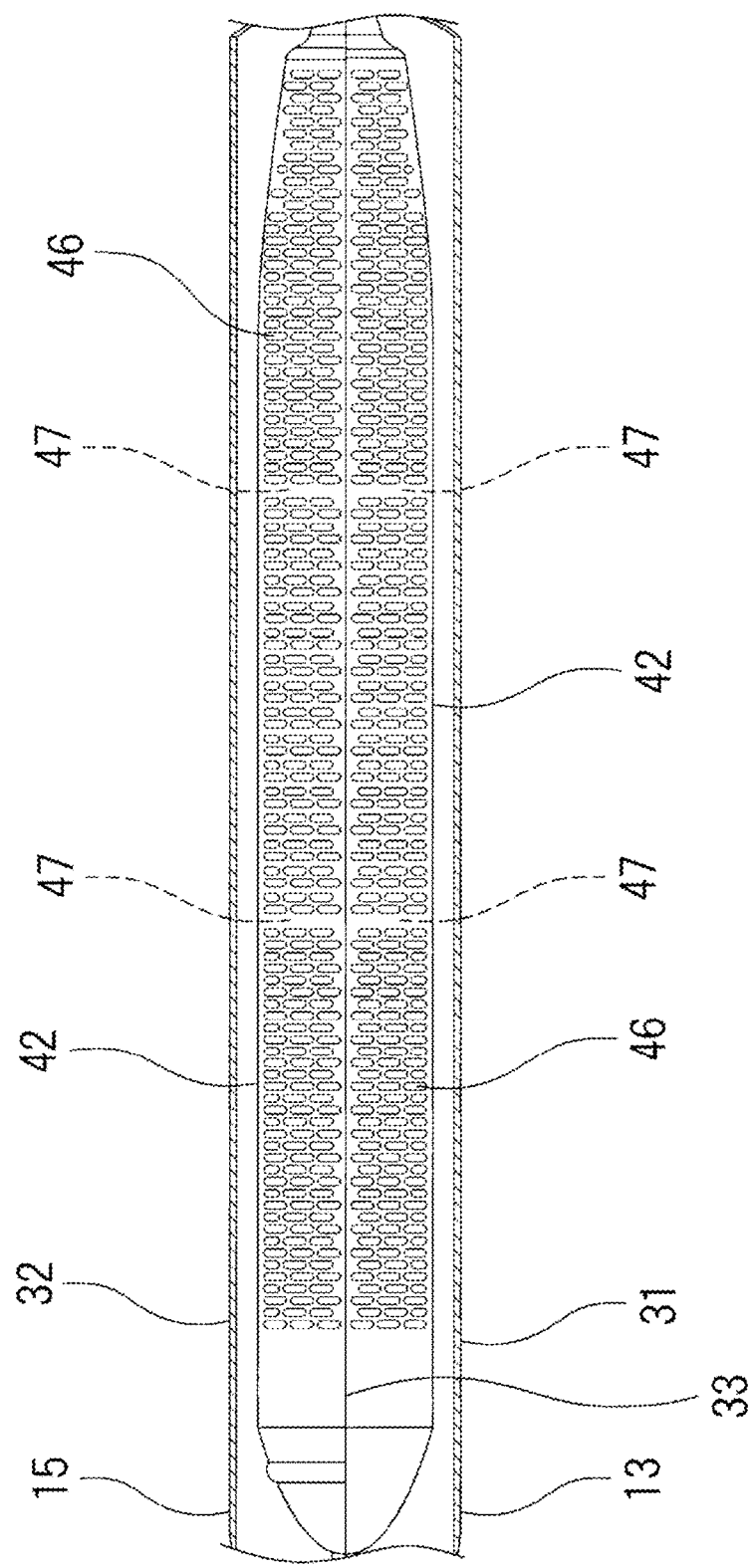
FIG. 9 is a cross-sectional view taken along line D-D of FIG. 8.
Figure 10:
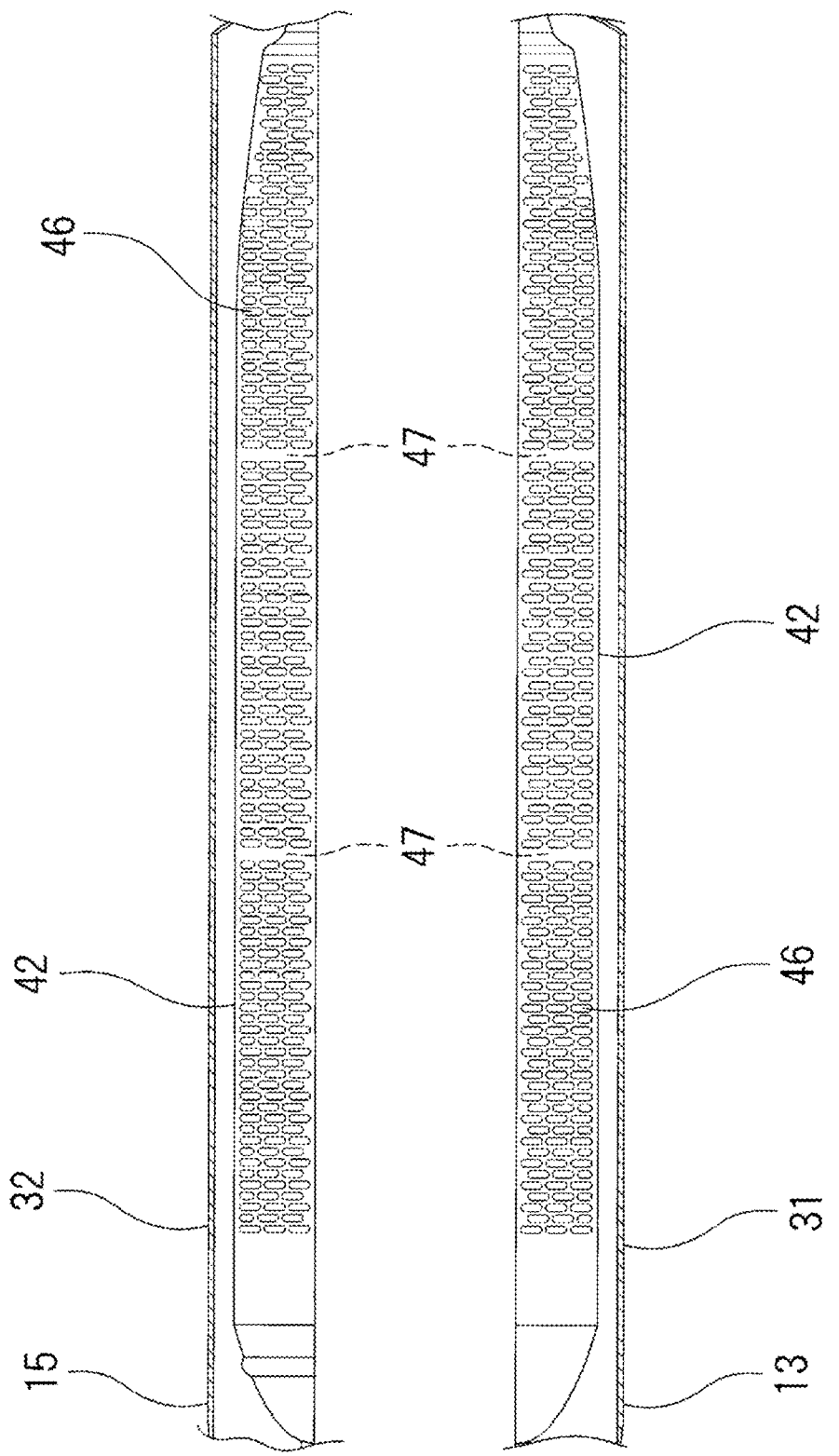
FIG. 10 is a cross-sectional view corresponding to FIG. 9, illustrating the nozzle housing that is separated.
Figure 11:
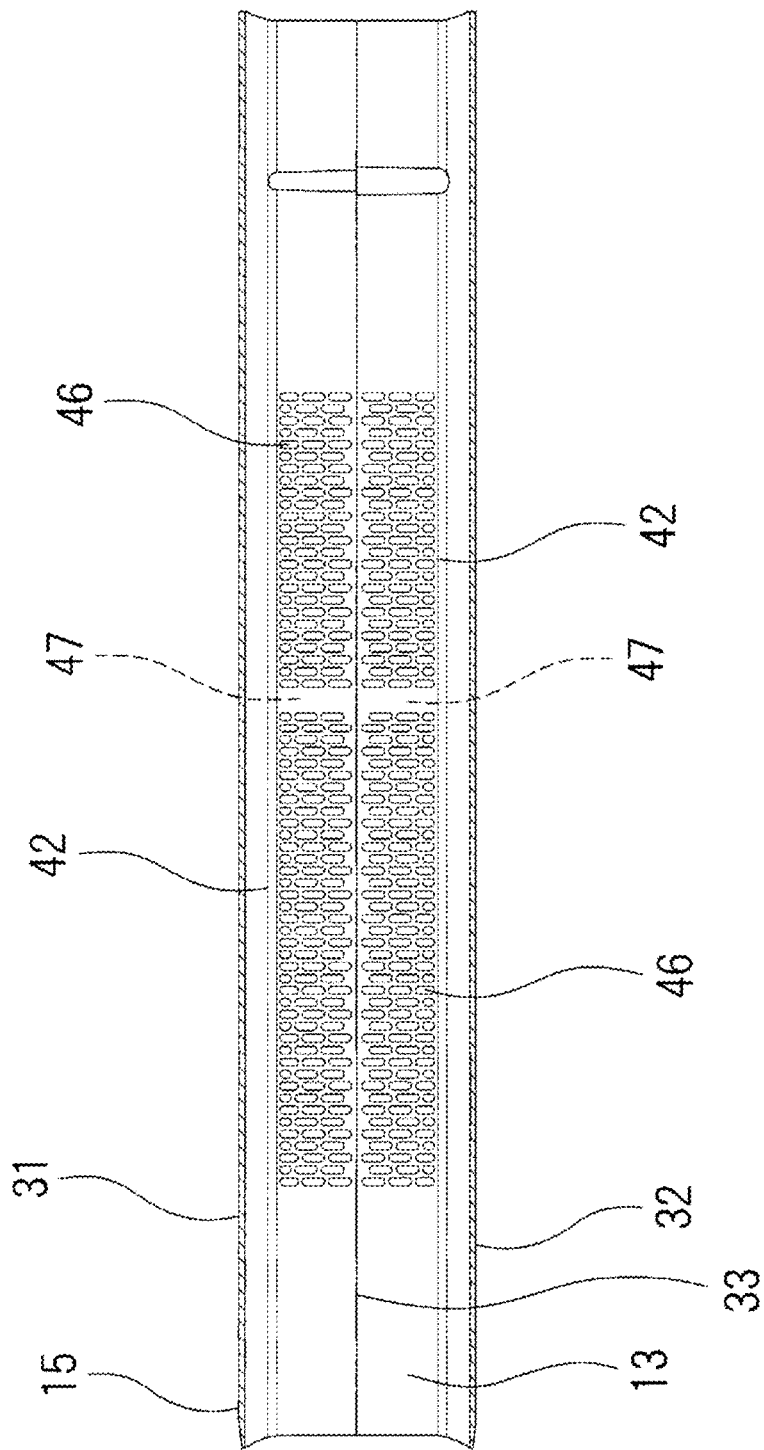
FIG. 11 is a cross-sectional view taken along line E-E of FIG. 8.
Figure 12:
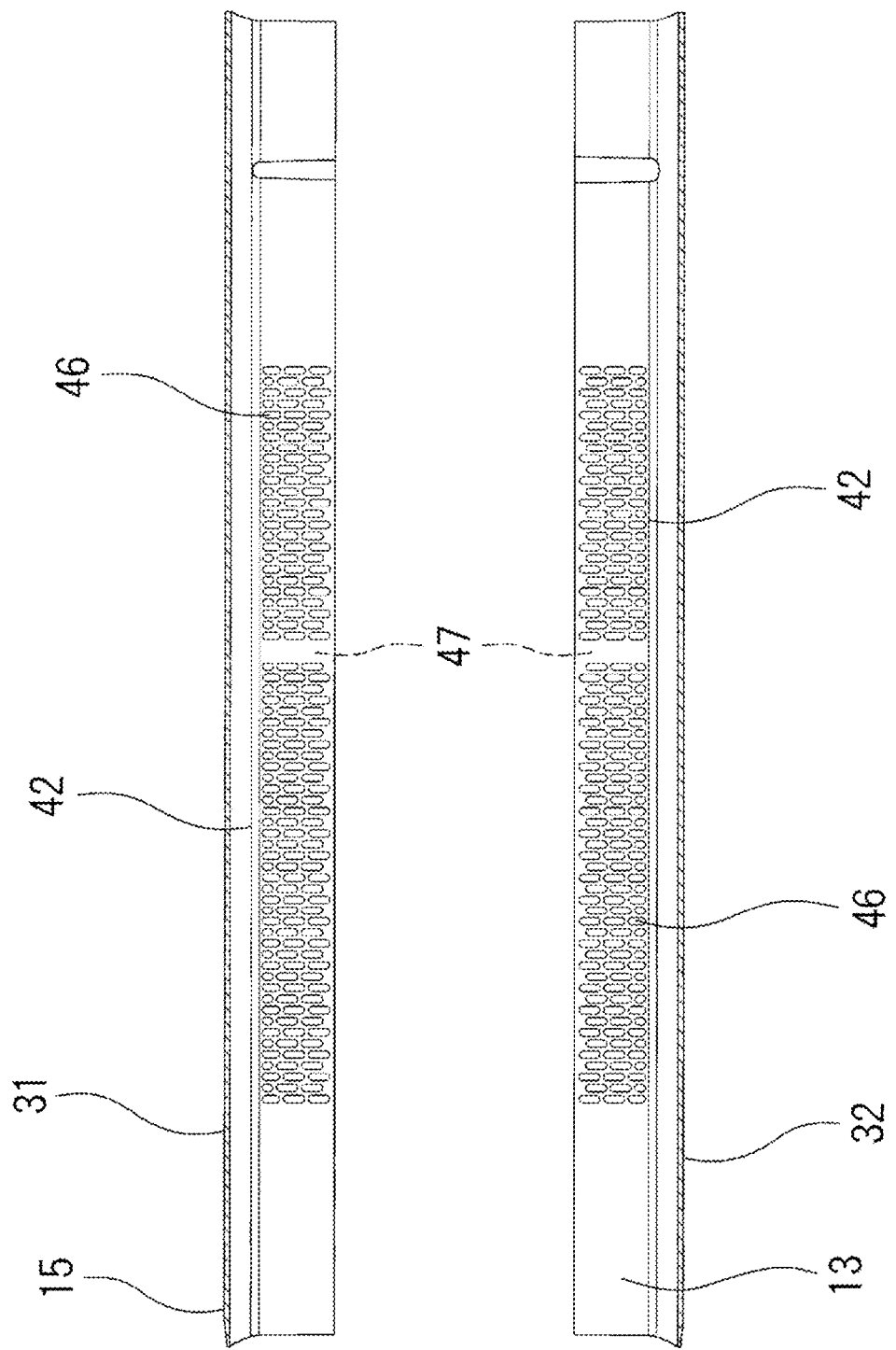
FIG. 12 is a cross-sectional view corresponding to FIG. 11, illustrating the nozzle housing that is separated.

The sound absorption section 41 on the intake side is composed of the nozzle housing 31, 32. The sound absorption section 41 is formed traversing the joint portion 33 laterally as illustrated in FIGS. 6 and 7. As also illustrated in FIGS. 8 to 12, the inner wall 42 and the outer wall 43 of the sound absorption section 41 are each divided into two portions in the respective first nozzle housing 31 and second nozzle housing 32. Thus, in a case that the first nozzle housing 31 and the second nozzle housing 32 are jointed to each other, the inner wall 42 and the outer wall 43 of the sound absorption section 41 are integrated to define and form the sound absorption chamber 44. The sound absorption member 45 is also divided laterally into two portions each of which is inserted into the corresponding one of a half chamber portion of the sound absorption chamber 44 of the first nozzle housing 31 and a half chamber portion of the sound absorption chamber 44 of the second nozzle housing 32.

The sound absorption section 41 provided above the air flow path 13 on the intake side is divided into three regions in the longitudinal direction, and has three independent sound absorption chambers 44. The three sound absorption chambers 44 each have an elongated shape along the air flow path 13 on the intake side, and are disposed in series in the longitudinal direction. Between the sound absorption chambers 44 adjacent to each other in the longitudinal direction, a partition wall 47 coupling the inner wall 42 and the outer wall 43 is formed. The partition wall 47 is provided with a screw boss 48 for coupling and integrating the first nozzle housing 31 and the second nozzle housing 32 with a screw. Likewise, the sound absorption section 41 provided below the air flow path 13 on the intake side is divided into two regions in the longitudinal direction with the partition wall 47, and has two independent sound absorption chambers 44. The two sound absorption chambers 44 each have an elongated shape along the air flow path 13 on the intake side, and are disposed in series in the longitudinal direction, and the partition wall 47 between the sound absorption chambers 44 is provided with the screw boss 48 for coupling and integrating the first nozzle housing 31 and the second nozzle housing 32 with a screw. Note that while the sound absorption chamber 44 has a configuration divided into a plurality of sections by the partition wall 47 to be discontinuous in the front-rear direction, the inner wall 42 and the outer wall 43 are continuous along the air flow path 13 on the intake side.

As illustrated in FIGS. 9 to 12, the plurality of communication holes 46 are formed substantially throughout the entire inner wall 42 of the sound absorption section 41 except a portion corresponding to the partition wall 47. In other words, the plurality of communication holes 46 are formed throughout the entire portion of the inner wall 42 corresponding to each of the sound absorption chambers 44. While any shape and placement of each of the communication holes 46 is available, the communication holes 46 are each formed in an oval shape elongated in a direction (right-left direction) orthogonal to the flow direction (longitudinal direction) of the air flow path 13 on the intake side, and are disposed in a staggered manner, in the present embodiment. The communication holes 46 are all provided at respective positions away from the joint portion 33, and are not formed traversing the joint portion 33. The communication holes 46 are formed in each of the first nozzle housing 31 and the second nozzle housing 32, and specifically, the communication holes 46 are formed uniformly in both of the first nozzle housing 31 and the second nozzle housing 32 to be laterally symmetrical to each other.

The first nozzle housing 31 and the second nozzle housing 32 are each made of a synthetic resin, and are each formed by injection molding. An ejection direction of a mold is the joint direction of the first nozzle housing 31 and the second nozzle housing 32. The communication holes 46 are formed along a direction orthogonal to the ejection direction of the mold. Thus, the mold includes an inner slide that moves out in a direction orthogonal to the ejection direction, and the communication holes 46 are formed by the inner slide. The communication holes 46 preferably have a total opening area of 40% or greater of an area of the inner wall 42 of the sound absorption section 41. The communication holes 46 are not formed in the outer wall 43 of the sound absorption section 41. The same applies to a sound absorption section 51 on the exhaust side described below. The inner wall 42 and the outer wall 43 of the sound absorption section 41 facing each other with the sound absorption chamber 44 interposed therebetween are each slightly inclined toward its opening due to a draft of the mold, i.e., inclined so as to gradually expand a separation distance between the walls with respect to the joint portion 33. Thus, the sound absorption member 45 can be easily inserted into and removed from the portion of the sound absorption chamber 44 of the first nozzle housing 31 and the portion of the sound absorption chamber 44 of the second nozzle housing 32.

Sound Absorption Section 51 on Exhaust Side

As illustrated in FIG. 4, the sound absorption section 51 on the exhaust side is formed along the entire length of the dust collection section 142. The dust collection section 142 extends substantially downward as a whole, so that the sound absorption section 51 is provided along an entire length of each of a front portion and a rear portion of the dust collection section 142. While the dust collection section 142 is curved along the flow direction, the sound absorption chamber 54 also curves in accordance with a shape of the dust collection section 142.

Figure 13:
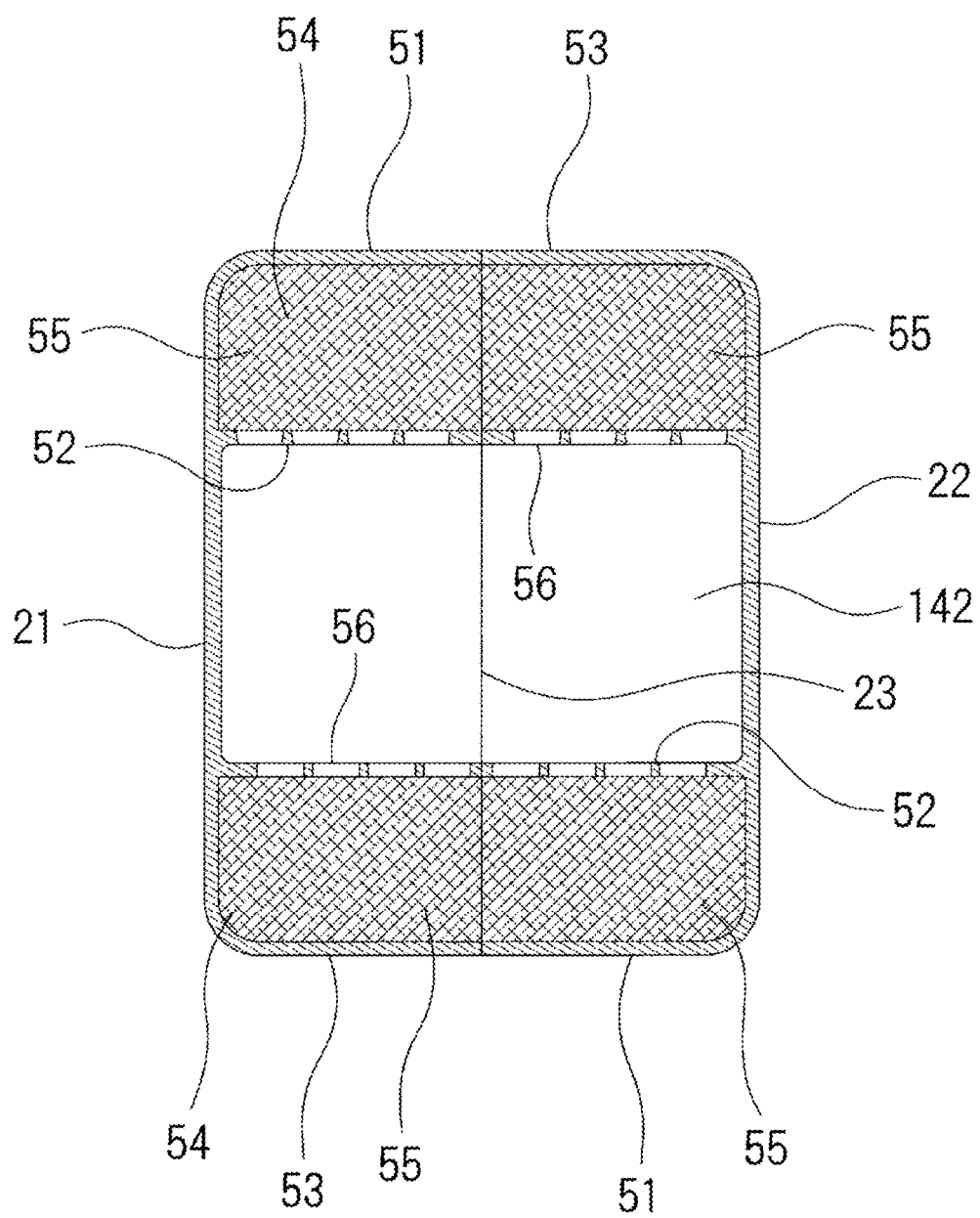
FIG. 13 is a cross-sectional view taken along line C-C of FIG. 4.
Figure 14:
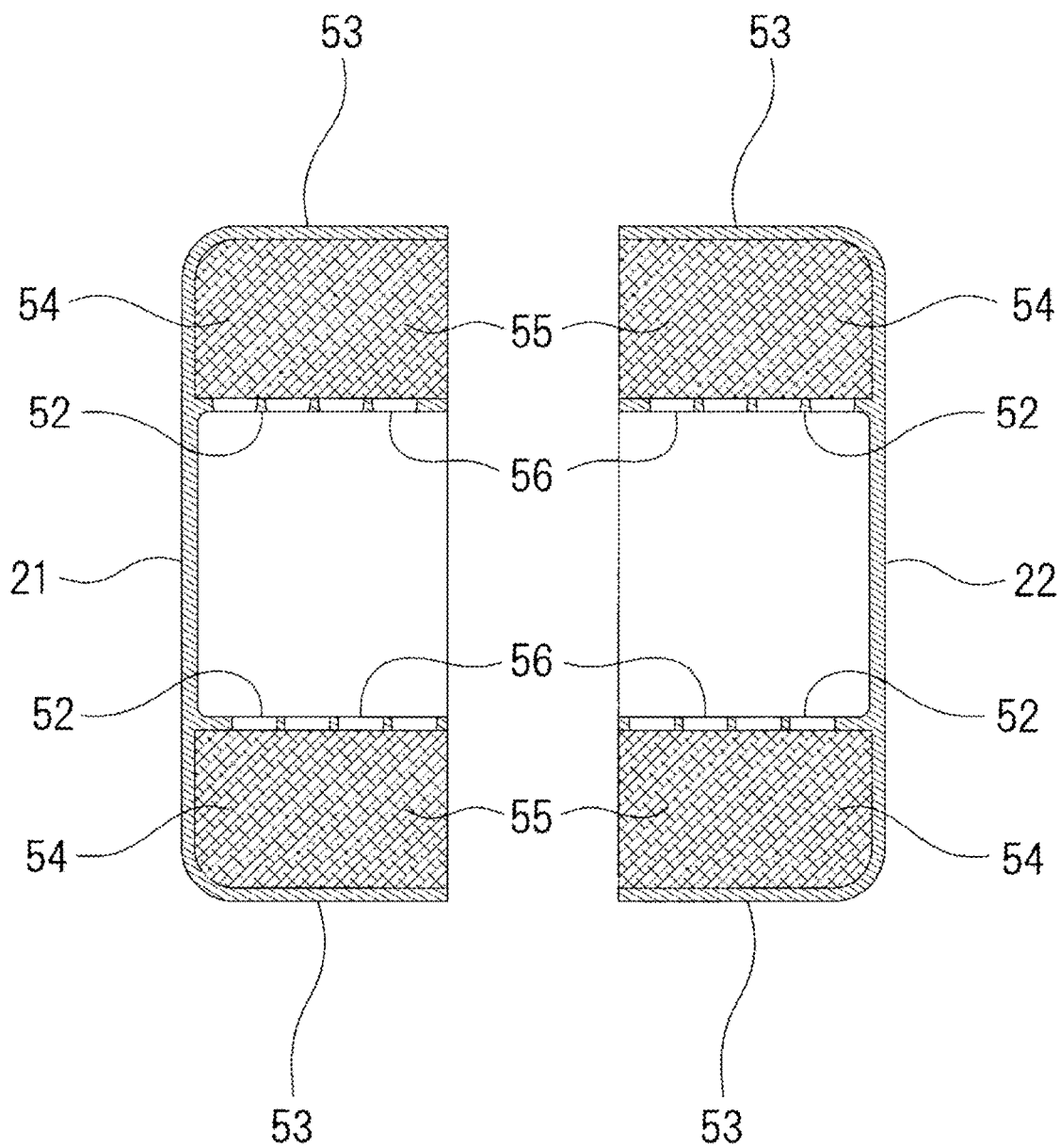
FIG. 14 is a cross-sectional view corresponding to FIG. 13, illustrating a main housing that is separated.
Figure 15:
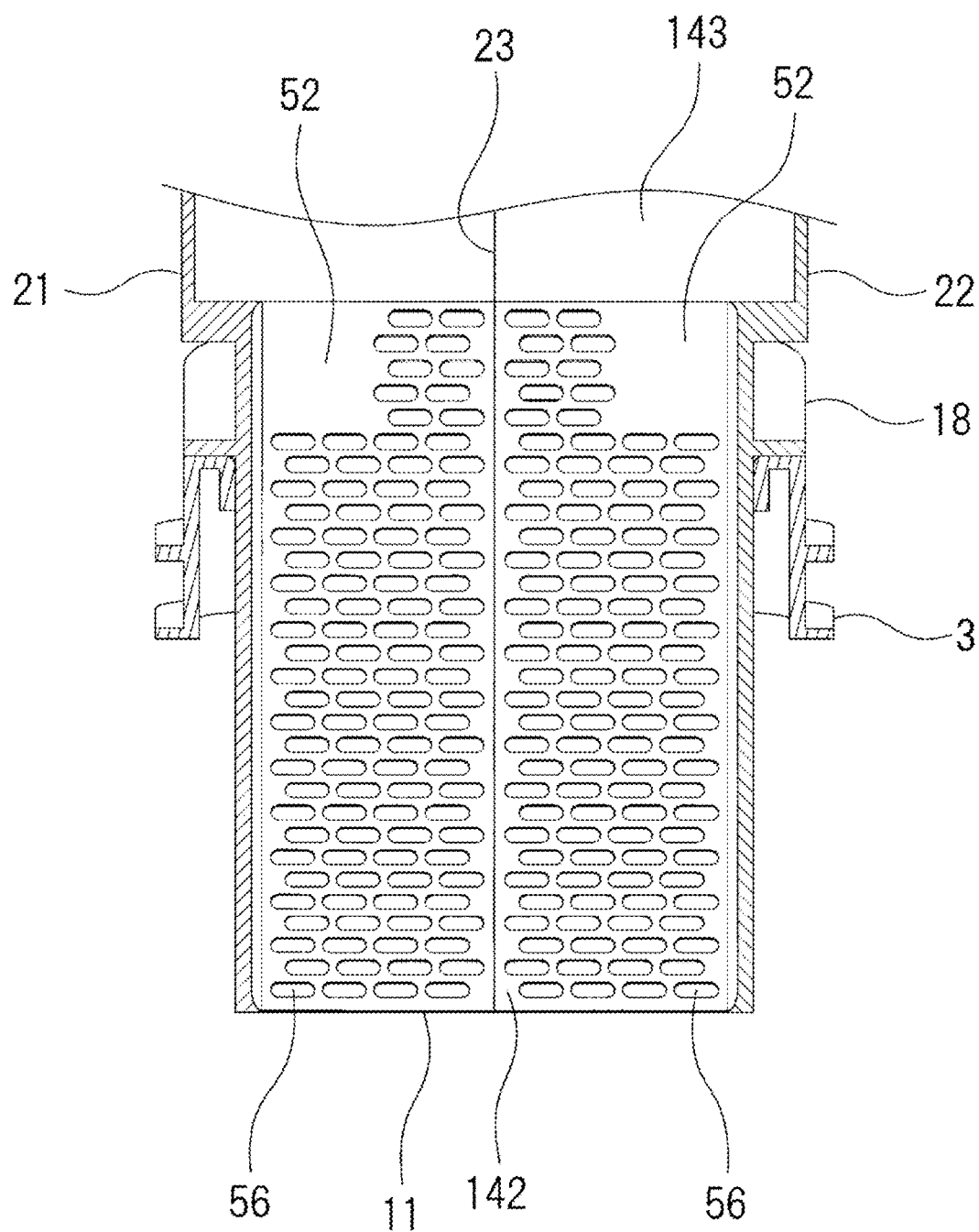
FIG. 15 is a cross-sectional view taken along line F-F of FIG. 4.
Figure 16:
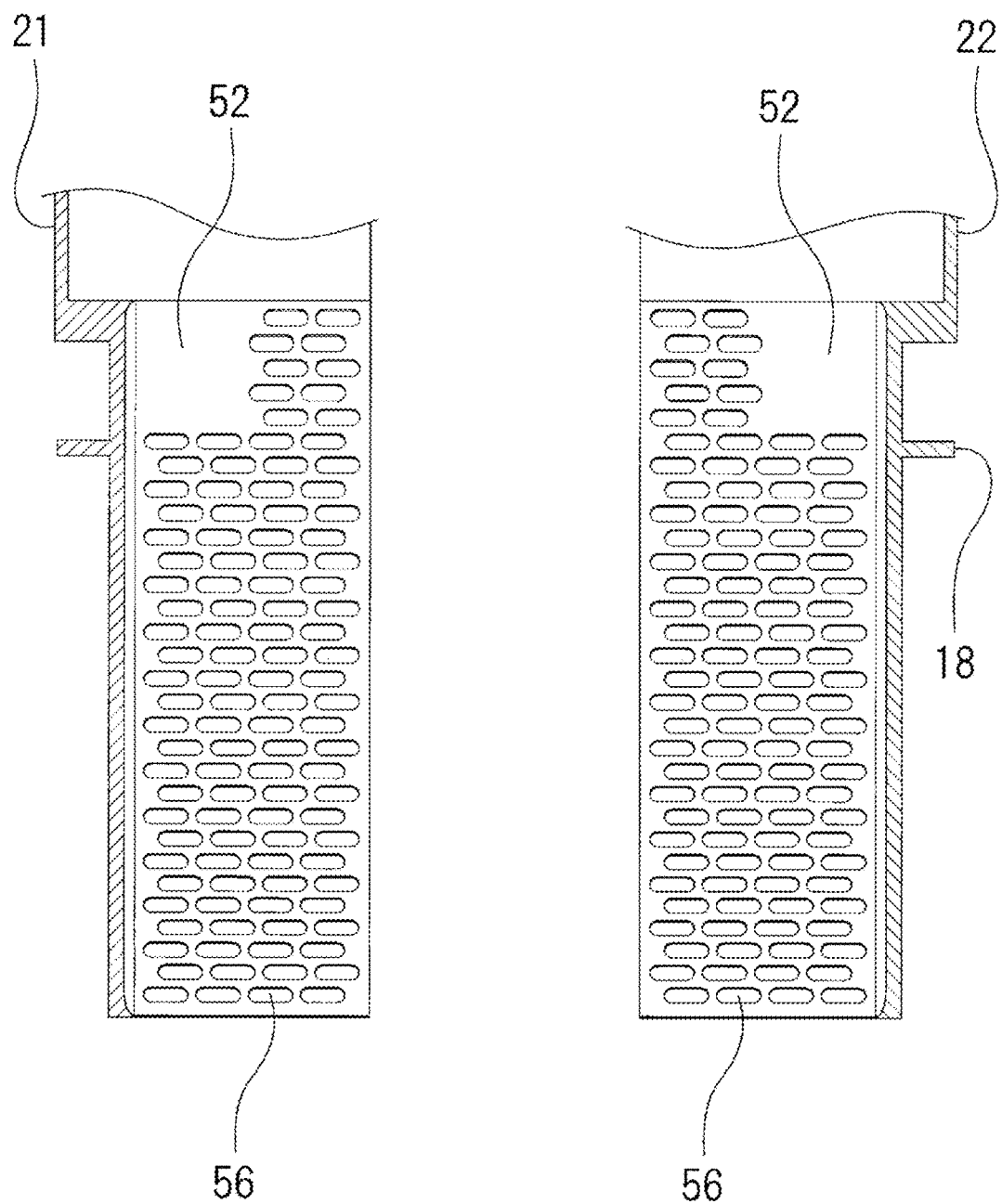
FIG. 16 is a cross-sectional view corresponding to FIG. 15, illustrating a main housing that is separated.
Figure 17:
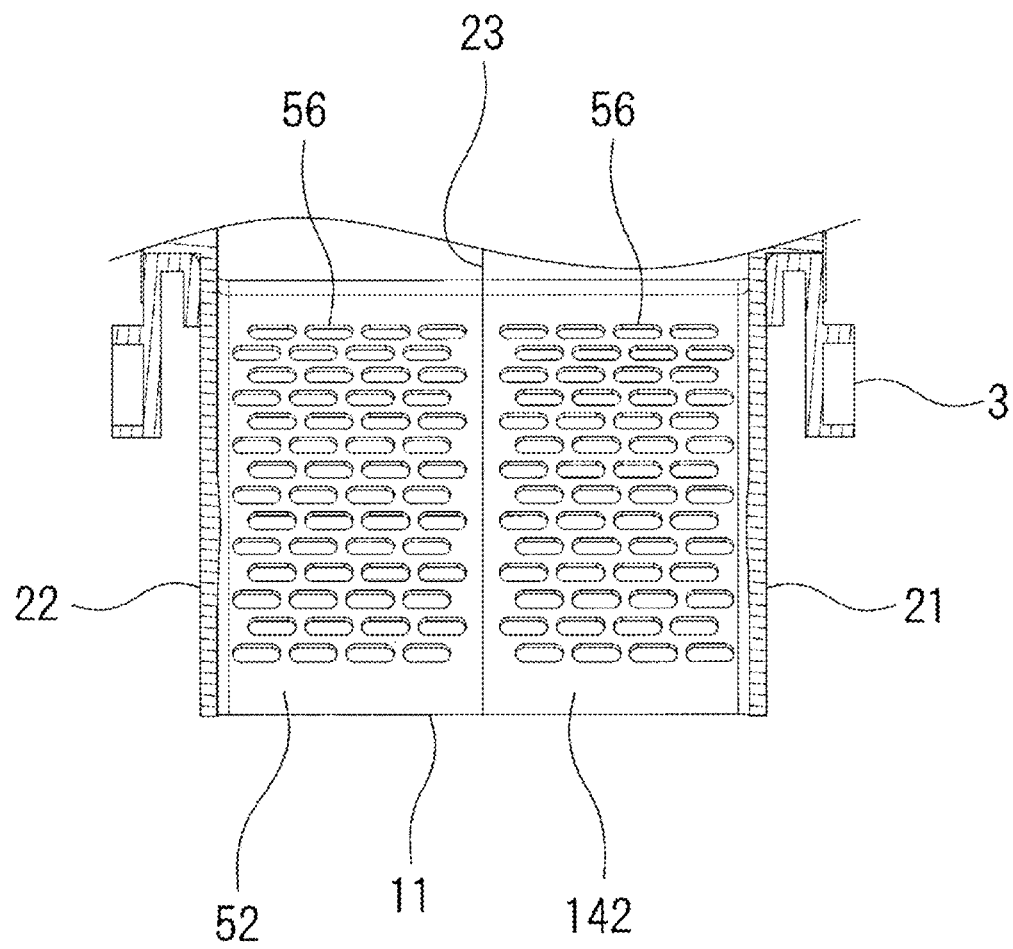
FIG. 17 is a cross-sectional view taken along line G-G of FIG. 4.
Figure 18:
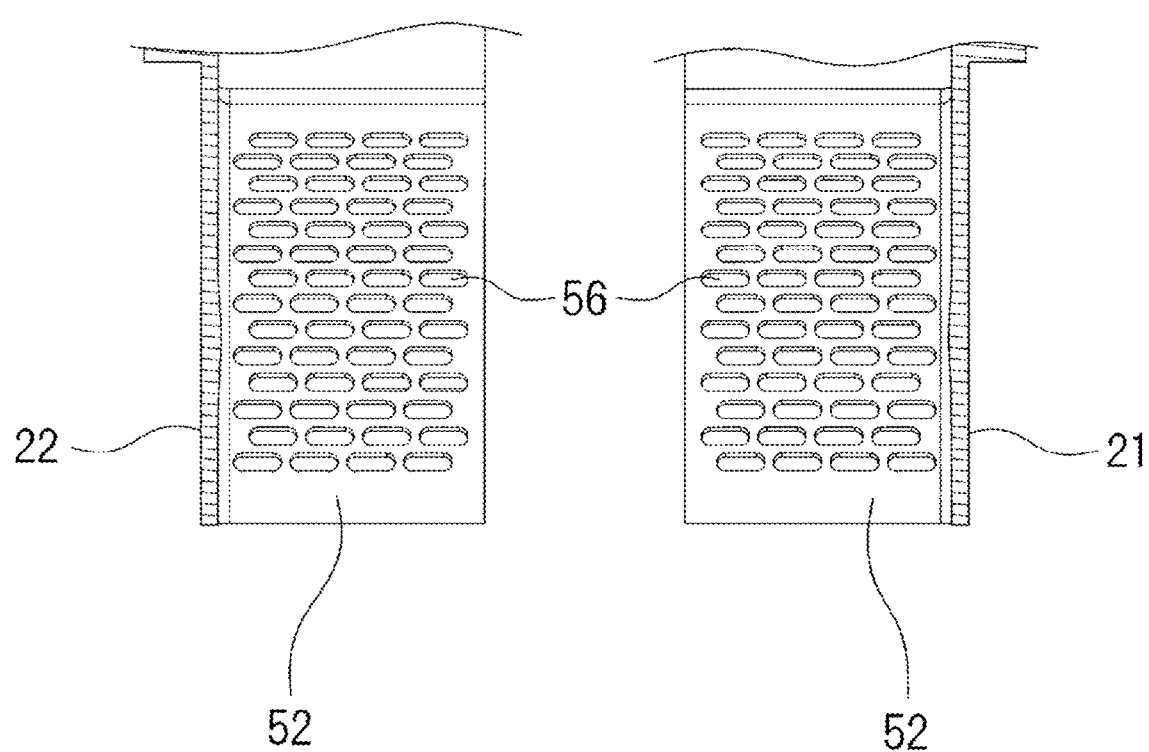
FIG. 18 is a cross-sectional view corresponding to FIG. 17, illustrating a main housing that is separated.

As illustrated in FIGS. 13 and 14, the sound absorption section 51 on the exhaust side is composed of the main housing 21, 22, and has a structure similar to that of the sound absorption section 41 on the intake side, and the description of a common structure may be omitted. As also illustrated in FIGS. 15 to 18, the inner wall 52 and the outer wall 53 of the sound absorption section 51 are divided laterally into two portions of the respective first main housing 21 and second main housing 22. In a case that the first main housing 21 and the second main housing 22 are jointed, the inner wall 52 and the outer wall 53 of the sound absorption section 51 are integrally formed, and then the sound absorption chamber 54 is defined and formed. The sound absorption member 55 is also divided laterally into two portions each of which is inserted into the corresponding one of a portion of the sound absorption chamber 54 of the first main housing 21 and a portion of the sound absorption chamber 54 of the second main housing 22. The sound absorption member 55 on the exhaust side is also made of a sponge in a plate-like shape similar to that of the sound absorption member 45 on the intake side. In a case that the sound absorption member 55 is inserted into the first main housing 21 and the second main housing 22, the sound absorption member 55 is inserted while being curved in accordance with a curved shape of the sound absorption member 54.

Unlike the sound absorption section 41 on the intake side, the sound absorption section 51 on each of the front portion and the rear portion of the dust collection section 142 is composed of one continuous region along the flow direction of the dust collection section 142. The sound absorption chamber 54 is also formed one by one in the front portion and the rear portion. As can be seen in FIG. 4, the sound absorption section 51 on the front side is longer than the sound absorption section 51 on the rear side. As with the sound absorption section 41 on the intake side, a large number of communication holes 56 are formed substantially throughout the inner wall 52 of the sound absorption section 51 as in FIGS. 15 to 18. The communication holes 56 are similar in shape and placement to the communication holes 46 on the intake side, and are each in an oval shape and disposed in a staggered manner. The communication holes 56 are also similar to those on the intake side in that the communication holes 56 are all provided at respective positions away from the joint portion 23, and are not formed traversing the joint portion 23. The communication holes 56 are formed uniformly in both of the first main housing 21 and the second main housing 22 to be laterally symmetrical to each other. The communication holes 56 preferably have a total opening area of 40% or greater of an area of the inner wall 52 of the sound absorption section 51, as with those on the intake side.

The electric vacuum configured as described above includes the sound absorption sections 41 and 51 that are provided respectively on the air flow path 13 on the intake side and the air flow paths 140 to 143 on the exhaust side, so that sounds in the air flow path 13 on the intake side and the air flow paths 140 to 143 on the exhaust side are respectively absorbed by the sound absorption sections 41 and 51. Thus, noise to be emitted to the outside from the intake port 10 and the exhaust port 11 for dust collection can be reduced. In addition, the sound absorption section 41 is provided in each of two facing portions above and below the air flow path 13 on the intake side, and the sound absorption section 51 is provided in each of two facing portions in front and rear of the dust collection section 142, so that noise can be efficiently reduced.

The dust collection section 142 is provided with the sound absorption section 51, so that noise can be effectively reduced in the air flow paths 140 to 143 on the exhaust side where noise increases due to the influence of a turbulent flow and the influence of crushing sound of fallen leaves and the like. In addition, the sound absorption section 51 is provided in the dust collection section 142 close to the exhaust port 11 for dust collection, in the air flow paths 140 to 143 on the exhaust side, so that noise to be emitted from the exhaust port 11 for dust collection can be effectively reduced. The exhaust port 11 for dust collection is an opening portion close to a worker, so that noise emitted therefrom is effectively reduced by the sound absorption section 51 of the dust collection section 142 to enable improvement in work environment. Furthermore, the sound absorption section 51 of the dust collection section 142 has a lower portion positioned inside the bag holder 3 and the dust bag 2, and the lower portion of the sound absorption section 51 of the dust collection section 142 is covered with the bag holder 3 and the dust bag 2 from outside. This structure can effectively reduce noise that is particularly likely to occur near the exhaust port 11 for dust collection due to a synergistic effect of the sound absorption section 51, the bag holder 3, and the dust bag 2. In addition, the lower portion of the sound absorption section 51 of the dust collection section 142 is configured to be inserted into the bag holder 3 and the dust bag 2, so that even the dust collection section 142 lengthened or enlarged is less likely to disturb operation to enable operability to be maintained.

The sound absorption section 41 on the intake side is formed traversing the joint portion 33 laterally between the first nozzle housing 31 and the second nozzle housing 32, and the sound absorption section 51 of the dust collection section 142 is formed traversing the joint portion 23 laterally between the first main housing 21 and the second main housing 22. This structure does not require a member such as a lid in addition to the nozzle housing 31, 32 and the main housing 21, 22, so that the sound absorption sections 41 and 51 can be provided, without increasing the number of components, at low cost, this facilitates assembly.

Furthermore, all of the communication holes 46 and 56 in the inner walls 42 and 52 of the sound absorption sections 41 of 51 are formed at respective positions away from the corresponding joint portions 33 and 23, so that the sound absorption members 45 and 55 can be smoothly inserted into the sound absorption chambers 44 and 54, respectively, from an opening of the first nozzle housing 31, the first main housing 21, or the like. The sound absorption chambers 44 and 54 of the first nozzle housing 31 and the like also gradually widen toward the corresponding openings of the chambers due to the draft of the mold, so that the sound absorption members 45 and 55 can be easily inserted into the sound absorption chambers 44 and 54, respectively, from the corresponding openings of the chambers.

A large number of the communication holes 46 and 56 are formed substantially throughout the inner wall 42 of the sound absorption section 41 on the intake side and the inner wall 52 of the sound absorption section 51 on the exhaust side, respectively, so that a large opening area can be ensured as a whole without excessively increasing the individual communication holes 46 and 56 in size. The communication holes 46 and 56 are also disposed in a staggered manner, and a decrease in strength of each of the inner walls 42 and 52 can be reduced.

The sound absorption section 41 on the intake side includes the plurality of sound absorption chambers 44 partitioned by the partition wall 47, so that the sound absorption section 41 on the intake side can be reinforced by the partition 47. In a case that the partition wall 47 is provided with the screw boss 48, the partition wall 47 can be efficiently used, and a reinforcing effect is also increased. The sound absorption section 41 on the intake side includes the inner wall 42 and the outer wall 43 that are integrally coupled by the partition 47. Thus, even in a case where a large number of the communication holes 46 are formed in the inner wall 42, a decrease in strength of the inner wall 42 can be minimized.

Figure 19:
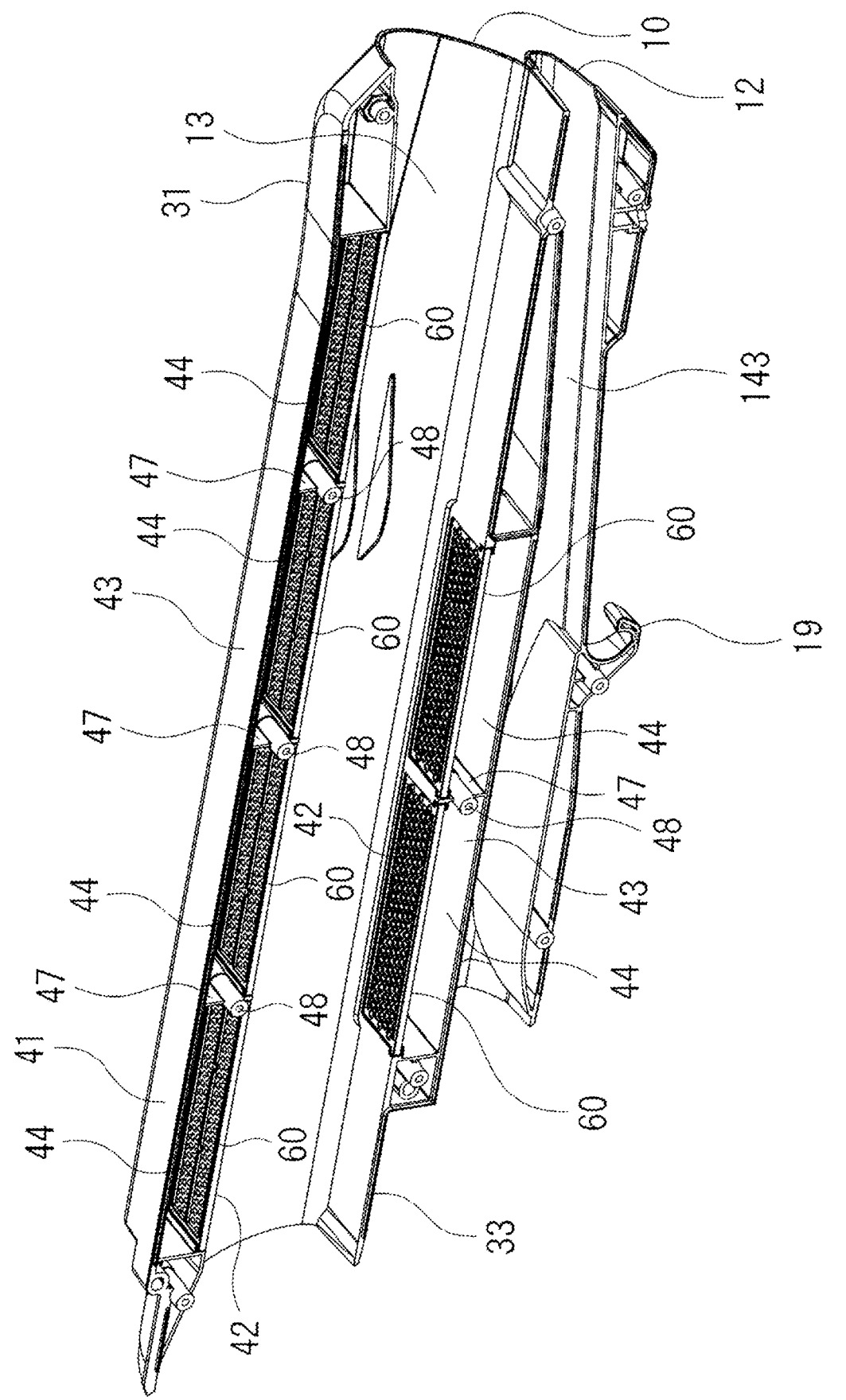
FIG. 19 is a perspective view illustrating a first nozzle housing of an electric vacuum according to another embodiment of the present invention.
Figure 20:
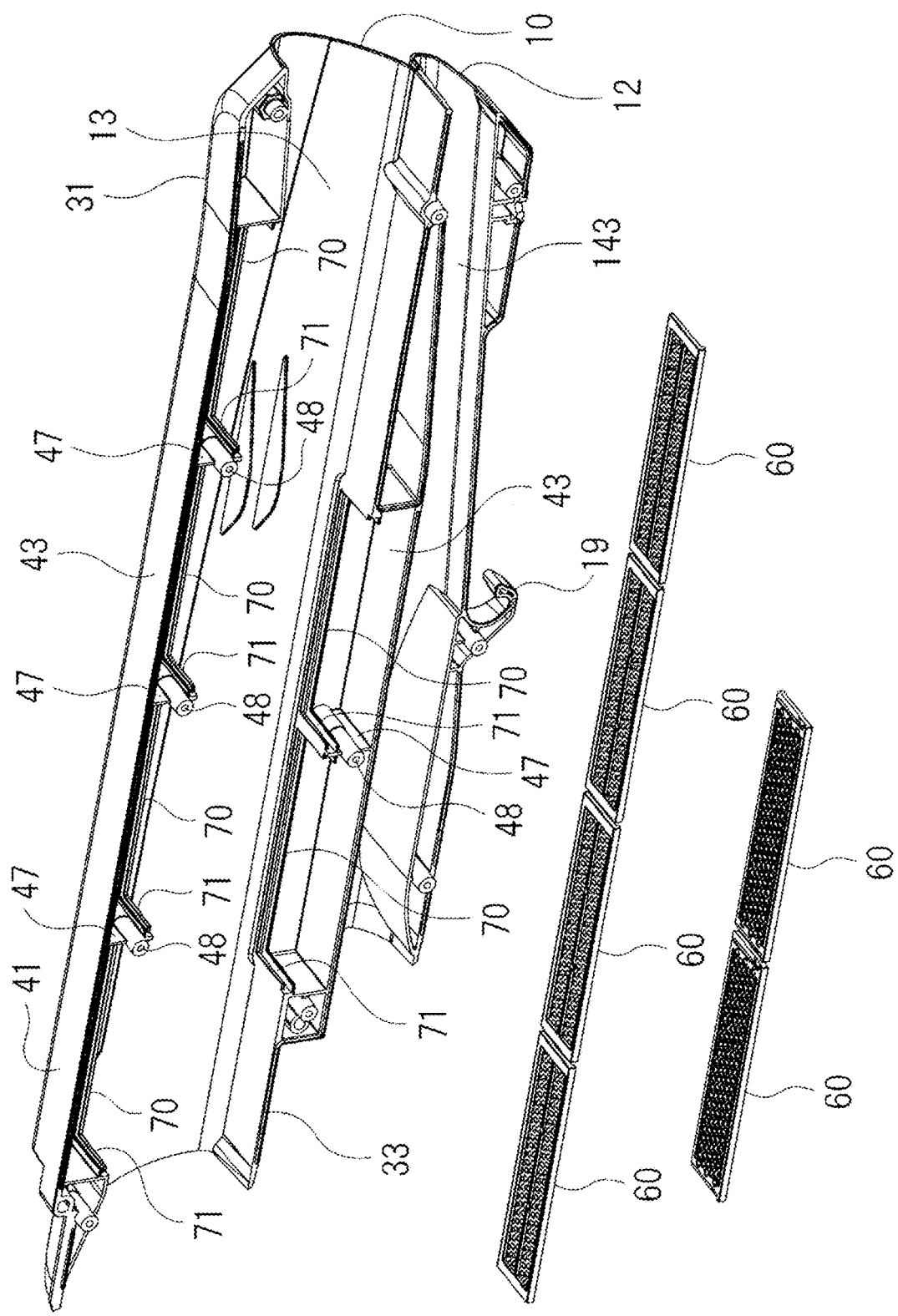
FIG. 20 is a perspective view illustrating a state before plates are attached to the first nozzle housing.

Regions of the inner walls 42 and 52 in which the communication holes 46 and 56 are formed, respectively, may be each composed of a separate member from the first main housing 21 and the second main housing 22, or the first nozzle housing 31 and the second nozzle housing 32. For example, the intake side will be described. FIG. 19 illustrates a perspective view of the first nozzle housing 31 as viewed from an air flow path 13 side on the intake side. Illustration of the sound absorption member 45 is omitted. Unlike the above-described embodiment, in this embodiment, the sound absorption section 41 provided above the air flow path 13 on the intake side is divided into four regions in the longitudinal direction by respective partition walls 47, and includes a total of four independent sound absorption chambers 44. Note that the sound absorption section 41 provided below the air flow path 13 on the intake side is divided into two regions in the longitudinal direction with the partition 47 interposed therebetween, and includes two independent sound absorption chambers 44, as with the above-described embodiment. The inner wall 42 includes portions corresponding to the respective sound absorption chambers 44 that are each composed of a plate 60 (wall component) which is a separate member from the first nozzle housing 31. The plate 60 is disposed for each of the sound absorption chambers 44. Four plates 60 corresponding to the four sound absorption chambers 44 are disposed side by side in the longitudinal direction above the air flow path 13 on the intake side, and two plates 60 corresponding to the two sound absorption chambers 44 are disposed side by side in the longitudinal direction below the air flow path 13 on the intake side. The first nozzle housing 31 includes a total of six plates 60 disposed up and down. All of these plates 60 have the same specifications. FIG. 20 illustrates a state in which the plates 60 are separated from the first nozzle housing 31. The total of six plates 60 are attached to the first nozzle housing 31, and each of the plates 60 constitutes a substantially entire portion of the inner wall 42, corresponding to the corresponding one of the sound absorption chambers 44.

Figure 21:
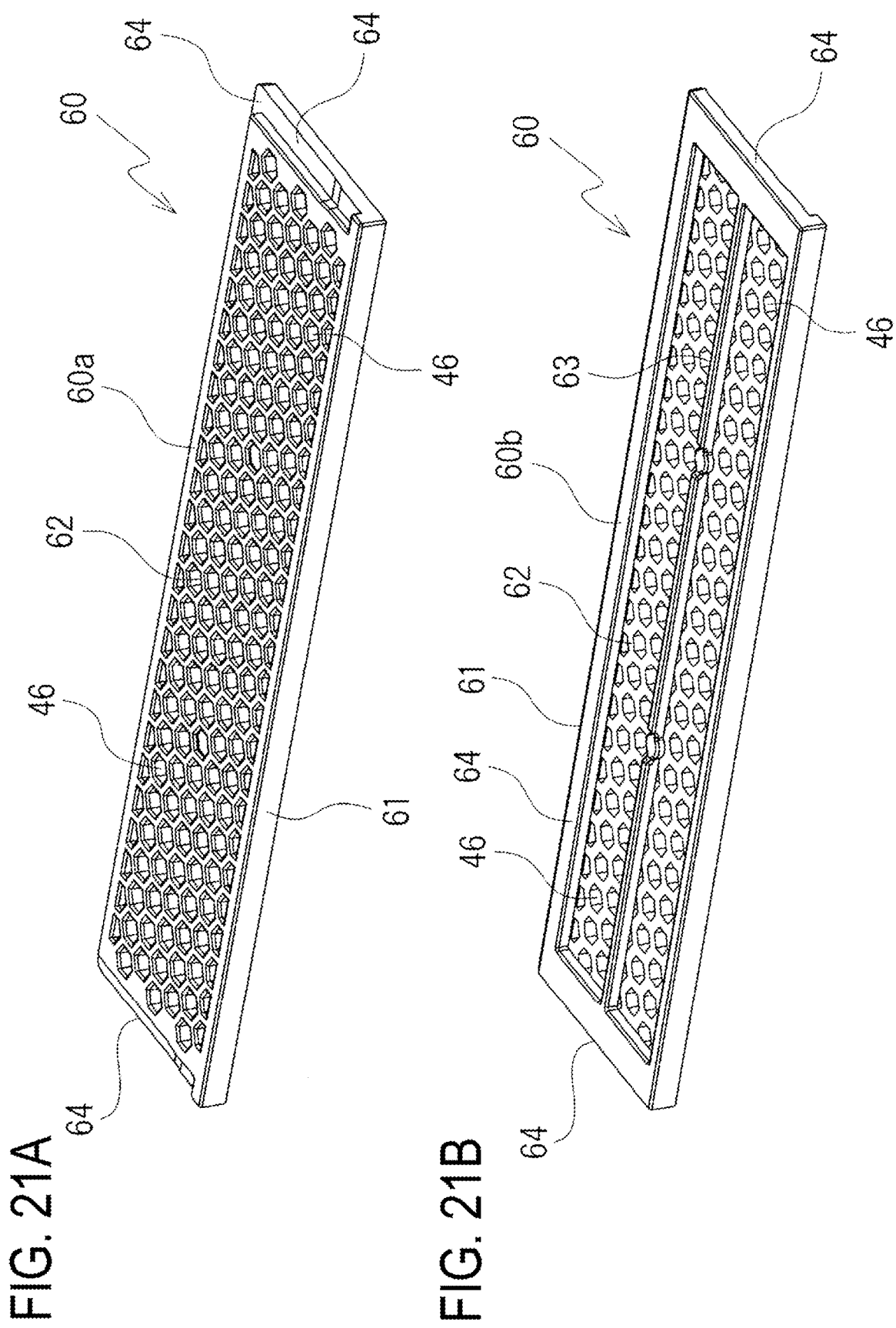
FIG. 21A is a perspective view of the plate of the electric vacuum as viewed from its front surface side.
FIG. 21B is a perspective view of the plate as viewed from its back surface side.

FIGS. 21A and 21B illustrate the details of the plate 60. FIG. 21A is a perspective view as viewed from a front surface 60a side, and FIG. 21B is a perspective view as viewed from a back surface 60b side. The plate 60 has a plate-like shape that is substantially flat and a rectangular shape, and is disposed such that a long side direction (longitudinal direction) thereof is the front-rear direction of the air flow path 13, i.e., is disposed along the air flow path 13. The plate 60 is provided with a plurality of communication holes 46 passing through the plate 60 in its thickness direction. The communication holes 46 are each in a hexagonal shape, for example. The plate 60 includes a frame portion 61 constituting a peripheral portion thereof and a panel portion 62 located inside the frame portion 61. The frame portion 61 surrounds the periphery of the panel portion 62. The panel portion 62 is formed thinner than the frame portion 61, and the plurality of communication holes 46 are formed in the panel portion 62. Note that the panel portion 62 includes a front surface that is substantially flush with a front surface of the frame portion 61 and a back surface stepped toward its front surface from a back surface of the frame portion 61. The panel portion 62 is also provided on the back surface with a reinforcing rib 63. The reinforcing rib 63 is located in a central portion in a short side direction (lateral direction) of the back surface of the panel portion 62 and extends along the longitudinal direction. The frame portion 61 is provided in its outer peripheral portions on three sides with respective engaging portions 64 stepped from a front surface 60a to be reduced in thickness.

Figure 22:
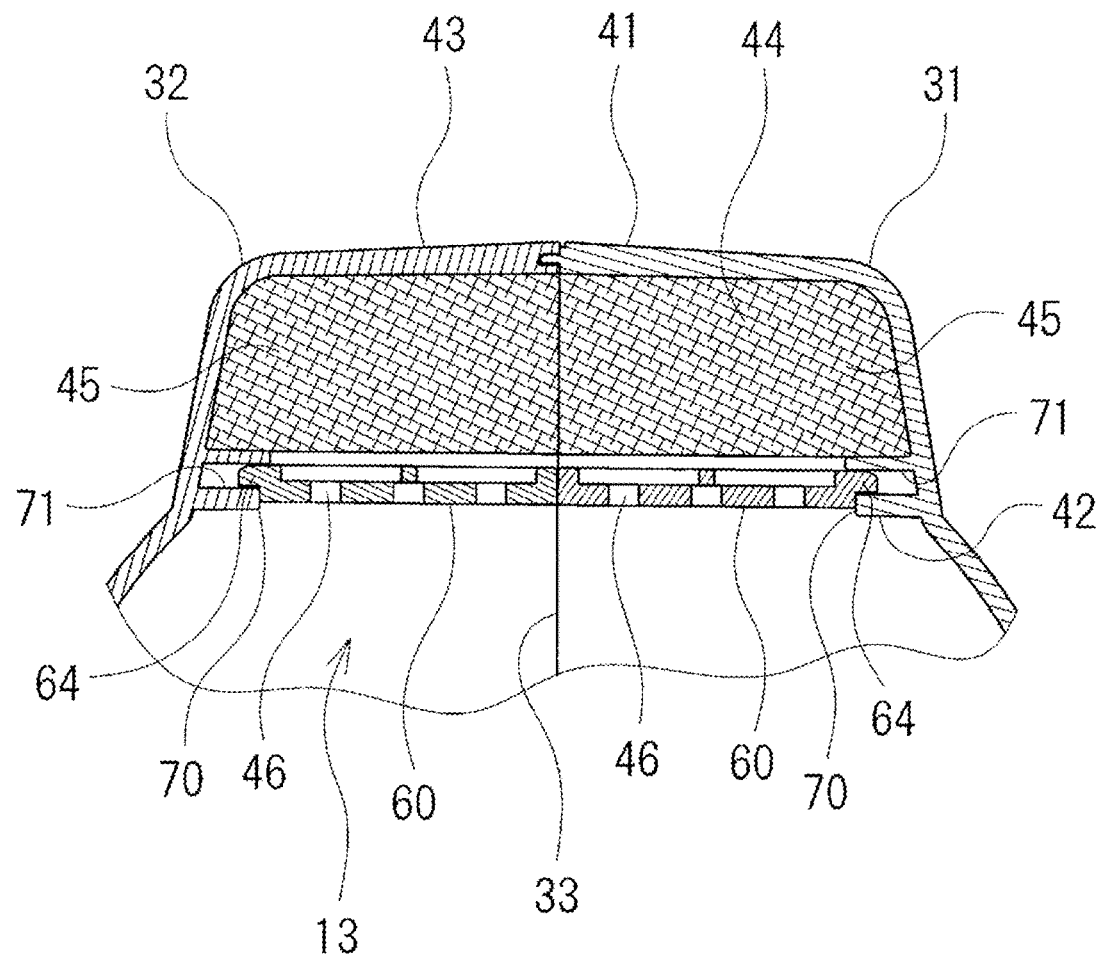
FIG. 22 is a cross-sectional view of a main portion of the electric vacuum, corresponding to FIG. 6.

As illustrated in FIGS. 20 and 22, a total of six cut-out recesses 70 cut from the joint portion 33 toward the outer wall 43 are formed in respective portions each of which corresponds to the inner wall 42 of the sound absorption chamber 44 of the first nozzle housing 31. The cut-out recesses 70 are each formed substantially throughout the inner wall 42 of the corresponding one of the sound absorption chambers 44, and the partition wall 47 is located between the cut-out recesses 70 adjacent to each other. The plates 60 are inserted into the corresponding cut-out recesses 70 one by one from a joint portion 33 side toward the outer wall 43. A direction in which the plates 60 are each inserted is a short side direction of the plates 60. The plates 60 are each disposed with its front surface 60a facing the air flow path 13. The cut-out recessed portions 70 are each provided in its three sidewall surfaces with respective slit-like engaging grooves 71 that are formed continuously to form a U-shape that is turned sideways. The engaging portions 64 of the plate 60 are fitted into the corresponding engaging grooves 71 of the cut-out recessed portion 70 from the joint portion 33 toward the outer wall 43 in a sliding manner. It is preferable that the front surface 60a of the plate 60 is substantially flush with a wall surface of the air flow path 13, and that at least the surface 60a of the plate 60 does not protrude from the wall surface of the air flow path 13. It is also preferable that an end surface of the plate 60 closer to the joint portion 33 is substantially flush with the joint portion 33, and thus at least the end surface of the plate 60 closer to the joint portion 33 does not protrude from the joint portion 33. Note that the second nozzle housing 32 is similarly configured.

In a case that all of the communication holes 46 are formed in the plates 60 which is a separate member from the first nozzle housing 31 and the second nozzle housing 32 as described above, the communication holes 46 can be easily provided in the inner wall 42 of the sound absorption section 41, and thus the first nozzle housing 31 and the second nozzle housing 32 can be easily manufactured by molding. The cut-out recessed portions 70 and the engaging grooves 71 are also formed along the joint direction, and thus can be simultaneously formed in a case that the first nozzle housing 31 and the second nozzle housing 32 are molded. The plate 60 can also be easily manufactured with a synthetic resin by molding. The communication holes 46 are formed along a thickness direction or a front-back direction of the plate 60, so that the communication holes 46 can be simultaneously formed by molding in a case that the front-back direction is set as a direction of being removed from a mold (direction of closing and opening the mold). The plate 60 is then required to be simply inserted into the cut-out recessed portions 70. This facilitates assembly operation of the plate 60. In a case that the first nozzle housing 31 and the second nozzle housing 32 are separated, the plate 60 can be removed or replaced.

The plate 60 also can be made of a material having greater strength than those of the first nozzle housing 31 and the second nozzle housing 32 to enable the inner wall 42 of the sound absorption section 41 to be easily increased in strength. In a case that the plate 60 is made of a material having excellent wear resistance and impact resistance, wear and breakage of the inner wall 42 of the sound absorption section 41 can be prevented, thereby enabling an electric vacuum having excellent durability, which is durable for long-term use, to be obtained. The communication holes 46 also can be changed in number or placement by only changing the plate 60 without changing the first nozzle housing 31 and the second nozzle housing 32 itself, so that design change of the sound absorption section 41 is also facilitated.

Note that various mounting structures are available for the plate 60, and thus, in addition to the structure of being fitted into the engaging grooves 71 as described above, the mounting structures may include fixing with a screw or a bolt, fixing using an adhesive, welding, and hooking with a claw, for example. The plate 60 may be similarly used for the exhaust side.

While the dust bag 2 having flexibility is used as the dust collection case in the embodiment described above, various structures such as a hard case may be available. In addition, a structure without the dust collection case may be available, and a duct for dust collection may be connected to the exhaust port 11 for dust collection, for example.

The sound absorption section 41 provided below the air flow path 13 on the intake side may also serve as a sound absorption section of the blowing section 143. That is, in a case that an upper wall of the blowing section 143, i.e., the outer wall 43 of the sound absorption section 41 below the air flow path 13 on the intake side, serves as an inner wall that is also provided with communication holes 46 to allow the sound absorption chamber 44 below the air flow path 13 on the intake side and the blowing section 143 to communicate with each other through the communication holes 46, the sound absorption section 41 provided below the air flow path 13 on the intake side can be used as the sound absorption section of the blowing section 143.

The sound absorption member 45 is configured to be laterally split into two segments each of which is inserted into the corresponding one of the first nozzle housing 31, the second nozzle housing 32, the first main housing 21, and the second main housing 22, but one sound absorption member 45 without being laterally split may be inserted into one sound absorption chamber 44, while traversing the joint portion 23. The sound absorption member 45 may not be a block in a plate-like shape or the like, and may be composed of a plurality of small lumps that are inserted into one sound absorption chamber 44. The sound absorption member 45 is not limited to a sponge, and may be a granular form, i.e., a granular foam, or may be felt, glass wool, or the like. The sound absorption member 45 may not be inserted in throughout the sound absorption chamber 44, and the sound absorption member 45 may be partially inserted in the sound absorption chamber 44.

While the sound absorption section 41 is provided on each of the intake side and the exhaust side, the sound absorption section 41 may be provided on any one of them. In addition, while the sound absorption section 41 is provided in the dust collection section 142 of the air flow paths 140 to 143 on the exhaust side, the sound absorption section 41 may be provided in the blowing section 143, or in the common sections 140 and 141.

While the sound absorption section 41 is provided individually up and down on the intake side in the above-described embodiment, the sound absorption section 41 may be provided only up or down. While the sound absorption section 51 is provided individually in front and back on the exhaust side, the sound absorption section 51 may be provided only in front or back. In other words, while the sound absorption sections 41 and 51 are individually provided at two respective places facing each other in a direction orthogonal to the right-left direction being the joint direction in the embodiment described above, the sound absorption sections 41 and 51 may be individually provided at any one of the two places facing each other in the direction orthogonal to the joint direction.

Further, a device having the blower function is described in the embodiment described above, but a structure without the blower function, i.e., without the exhaust port 12 for blowing and the switching drum 6, may be available.

The sound absorption sections 41 and 51 having the structure described above may be provided in a component such as a pipe attached to and detached from various types of air flow generating device, as an attachment.

The invention claimed is:

1. A sound absorption structure for an air flow path in an electric air flow generation device, the sound absorption structure comprising:

an air flow path through which an air flow for blowing or drawing passes, the air flow path having a structure split in two and being formed with a first housing and a second housing being jointed to each other; and a sound absorption section provided at a predetermined position on the air flow path, traversing a joint portion between the first housing and the second housing, wherein the sound absorption section has a double wall structure comprising:

an inner wall facing the air flow path and an outer wall spaced outward from the inner wall, a sound absorption member is interposed in a sound absorption chamber between the inner wall and the outer wall of the sound absorption section; and a communication hole communicating with the air flow path and the sound absorption chamber is formed in the inner wall of the sound absorption section at a position away from the joint portion.

2. The sound absorption structure for an air flow path in an electric air flow generation device, according to claim 1, wherein a plurality of the sound absorption chambers divided into an upstream side and a downstream side of the air flow path by a partition wall are provided, the partition wall comprises a screw boss configured to integrally couple the first housing to the second housing with a screw, and a large number of the communication holes are formed substantially throughout the inner wall of the sound absorption section, except a portion corresponding to the partition wall.

3. The sound absorption structure for an air flow path in an electric air flow generation device, according to claim 1, wherein the inner wall of the sound absorption member comprises a wall component composed of a separate member from the first housing and the second housing, and a communication hole is formed in the wall component.

4. An electric vacuum comprising:

an air flow path having a structure split in two and formed with a first housing and a second housing being jointed to each other;

a fan disposed midway of the air flow path and configured to generate an air flow; and a sound absorption section provided along the air flow path on an exhaust side of the fan, traversing a joint portion between the first housing and the second housing, wherein the sound absorption section has a double wall structure comprising:

an inner wall facing the air flow path and an outer wall spaced outward from the inner wall;

a sound absorption member is interposed in a sound absorption chamber between the inner wall and the outer wall of the sound absorption section; and a communication hole communicating with the air flow path and the sound absorption chamber is formed in the inner wall of the sound absorption section at a position away from the joint portion.

5. The electric vacuum according to claim 4, further comprising:

a dust collection case that is detachable; and wherein a sound absorption section is provided near an exhaust port of the air flow path configured to allow air to be exhausted to the dust collection case, and at least a portion of the sound absorption section is located inside the dust collection case in a case that the dust collection case is attached.

* * * * *